(12) United States Patent
Fiebig et al.

(10) Patent No.: US 11,583,158 B2
(45) Date of Patent: Feb. 21, 2023

(54) ROBOTIC VACUUM CLEANER

(71) Applicant: SharkNinja Operating, LLC, Needham, MA (US)

(72) Inventors: Charles Fiebig, Needham, MA (US); Isaku D. Kamada, Brighton, MA (US); William Wang, Needham, MA (US); Ming Yao, Suzhou (CN); Rain Gu, Suzhou (CN); Melinda L. Liggett, Watertown, MA (US); Kennedy Huang, Needham, MA (US); Charles S. Brunner, Stockton, NJ (US)

(73) Assignee: SharkNinja Operating LLC, Needham, MA (US)

( * ) Notice: Subject to any disclaimer, the term of this patent is extended or adjusted under 35 U.S.C. 154(b) by 559 days.

(21) Appl. No.: 16/529,496

(22) Filed: Aug. 1, 2019

(65) Prior Publication Data

US 2020/0037843 A1    Feb. 6, 2020

Related U.S. Application Data

(60) Provisional application No. 62/713,207, filed on Aug. 1, 2018.

(51) Int. Cl.
*A47L 11/40* (2006.01)

(52) U.S. Cl.
CPC ....... *A47L 11/4061* (2013.01); *A47L 2201/02* (2013.01); *A47L 2201/04* (2013.01)

(58) Field of Classification Search
CPC ............. A47L 11/4061; A47L 2201/02; A47L 2201/04; A47L 9/2889; A47L 9/30; A47L 9/2805; A47L 2201/06; A47L 11/24; A47L 11/40; A47L 11/4008; A47L 11/4011; A47L 11/4036; A47L 11/4077; A47L 11/4094

See application file for complete search history.

(56) References Cited

U.S. PATENT DOCUMENTS

| | | |
|---|---|---|
| 3,744,077 A | 7/1973 | Smyth |
| 3,881,568 A | 5/1975 | Ando et al. |
| 4,133,404 A | 1/1979 | Griffin |
| 4,282,430 A | 8/1981 | Hatten et al. |

(Continued)

FOREIGN PATENT DOCUMENTS

| | | |
|---|---|---|
| CN | 1683088 A | 10/2005 |
| CN | 201019678 Y | 2/2008 |

(Continued)

OTHER PUBLICATIONS

US 8,275,482 B2, 09/2012, Casey et al. (withdrawn)

(Continued)

*Primary Examiner* — David Redding
(74) *Attorney, Agent, or Firm* — Grossman Tucker Perreault & Pfleger, PLLC

(57) ABSTRACT

A robotic vacuum cleaner may include a housing, a displaceable bumper, an emitter/detector pair, and at least one divider. The displaceable bumper may be moveably coupled to the housing and may be configured to be displaced along at least one axis. The emitter/detector pair may have an emitter and a detector, wherein the emitter is configured to emit light through at least a portion of the displaceable bumper. The at least one divider may be disposed between the emitter and the detector of the emitter/detector pair.

20 Claims, 15 Drawing Sheets

(56) References Cited

U.S. PATENT DOCUMENTS

| | | |
|---|---|---|
| 4,412,129 A | 10/1983 | Duncan |
| 4,659,922 A | 4/1987 | Duncan |
| 4,703,240 A | 10/1987 | Yoshimoto et al. |
| 4,844,493 A | 7/1989 | Kramer |
| 4,920,520 A | 4/1990 | Goebel et al. |
| 5,040,116 A | 8/1991 | Evans, Jr. et al. |
| 5,293,955 A | 3/1994 | Lee |
| 5,341,540 A | 8/1994 | Soupert et al. |
| 5,396,070 A | 3/1995 | Lee |
| 5,550,369 A | 8/1996 | Skell et al. |
| 5,760,390 A | 6/1998 | Vezzalini et al. |
| 6,407,911 B1 | 6/2002 | Spence et al. |
| 6,481,515 B1 | 11/2002 | Kirkpatrick et al. |
| 6,594,844 B2 | 7/2003 | Jones |
| 6,600,899 B1 | 7/2003 | Radomsky et al. |
| 6,942,153 B1 | 9/2005 | Yuan et al. |
| 6,982,381 B1 | 1/2006 | Backofen et al. |
| 6,983,130 B2 | 1/2006 | Chien et al. |
| 7,004,269 B2 | 2/2006 | Song et al. |
| 7,155,308 B2 | 12/2006 | Jones |
| 7,233,122 B2 | 6/2007 | Kim et al. |
| 7,343,221 B2 | 3/2008 | Ann |
| 7,429,843 B2 | 9/2008 | Jones et al. |
| 7,430,455 B2 | 9/2008 | Casey et al. |
| 7,474,941 B2 | 1/2009 | Kim et al. |
| 7,489,985 B2 | 2/2009 | Ko et al. |
| 7,499,775 B2 | 3/2009 | Filippov et al. |
| 7,615,957 B2 | 11/2009 | Kim et al. |
| 7,647,144 B2 | 1/2010 | Haegermarck |
| 7,673,367 B2 | 3/2010 | Kim et al. |
| 7,729,803 B2 | 6/2010 | Lim et al. |
| 7,779,504 B2 | 8/2010 | Lee et al. |
| 7,787,991 B2 | 8/2010 | Jeung et al. |
| 7,891,045 B2 | 2/2011 | Kim et al. |
| 7,992,251 B2 | 8/2011 | Chung et al. |
| 8,224,487 B2 | 7/2012 | Yoo et al. |
| 8,301,304 B2 | 10/2012 | Jung et al. |
| 8,380,350 B2 | 2/2013 | Ozick et al. |
| 8,396,592 B2 | 3/2013 | Jones et al. |
| 8,516,651 B2 | 8/2013 | Jones et al. |
| 8,521,329 B2 | 8/2013 | Park et al. |
| 8,572,799 B2 | 11/2013 | Won et al. |
| 8,575,892 B2 | 11/2013 | Kim |
| 8,584,306 B2 | 11/2013 | Chung et al. |
| 8,600,553 B2 | 12/2013 | Svendsen et al. |
| 8,635,739 B2 | 1/2014 | Lee et al. |
| 8,688,270 B2 | 4/2014 | Roy et al. |
| 8,688,272 B2 | 4/2014 | Hong et al. |
| 8,756,751 B2 | 6/2014 | Jung et al. |
| 8,788,092 B2 | 7/2014 | Casey et al. |
| 8,801,057 B2 | 8/2014 | Kim et al. |
| 8,825,256 B2 | 9/2014 | Kim et al. |
| 8,862,271 B2 | 10/2014 | Shamlian et al. |
| 8,950,792 B2 | 2/2015 | Hickey et al. |
| 9,042,095 B2 | 5/2015 | Song et al. |
| 9,078,552 B2 | 7/2015 | Han et al. |
| 9,144,355 B2 | 9/2015 | Jang et al. |
| 9,178,370 B2 | 11/2015 | Henricksen et al. |
| 9,223,312 B2 | 12/2015 | Goel et al. |
| 9,414,734 B2 | 8/2016 | Moon et al. |
| 9,436,185 B2 | 9/2016 | Schnittman |
| 9,468,349 B2 | 10/2016 | Fong et al. |
| 9,505,140 B1 | 11/2016 | Fay et al. |
| 9,526,391 B2 | 12/2016 | Lee et al. |
| 9,751,214 B2 | 9/2017 | Kim et al. |
| 10,130,233 B2 | 11/2018 | Jang et al. |
| 10,199,840 B2 | 2/2019 | Shudo |
| 10,376,120 B2 | 8/2019 | Neumann et al. |
| 2004/0236468 A1 | 11/2004 | Taylor et al. |
| 2005/0010330 A1 | 1/2005 | Abramson et al. |
| 2005/0010331 A1 | 1/2005 | Taylor et al. |
| 2005/0217042 A1 | 10/2005 | Reindle |
| 2006/0021168 A1 | 2/2006 | Nishikawa |
| 2008/0281470 A1 | 11/2008 | Gilbert, Jr. et al. |
| 2011/0140829 A1 | 6/2011 | Veenstra |
| 2012/0181099 A1 | 7/2012 | Moon et al. |
| 2012/0291809 A1 | 11/2012 | Kuhe et al. |
| 2012/0311813 A1 | 12/2012 | Gilbert, Jr. et al. |
| 2013/0152332 A1 | 6/2013 | Jang |
| 2013/0204483 A1 | 8/2013 | Sung et al. |
| 2013/0211589 A1 | 8/2013 | Landry et al. |
| 2014/0130294 A1 | 5/2014 | Li et al. |
| 2014/0156076 A1 | 6/2014 | Jeong et al. |
| 2014/0188325 A1 | 7/2014 | Johnson et al. |
| 2014/0304937 A1 | 10/2014 | Kim et al. |
| 2016/0073839 A1 | 3/2016 | Janzen et al. |
| 2016/0075021 A1 | 3/2016 | Cohen et al. |
| 2016/0166127 A1 | 6/2016 | Lewis |
| 2016/0235270 A1 | 8/2016 | Santini |
| 2017/0150859 A1 | 6/2017 | Muir |
| 2018/0078106 A1 | 3/2018 | Scholten et al. |

FOREIGN PATENT DOCUMENTS

| | | |
|---|---|---|
| CN | 101375781 | 3/2009 |
| CN | 201469183 | 5/2010 |
| CN | 201591525 | 9/2010 |
| CN | 201602713 | 10/2010 |
| CN | 102039595 | 5/2011 |
| CN | 102218740 | 10/2011 |
| CN | 202141815 | 2/2012 |
| CN | 102866433 | 1/2013 |
| CN | 203436287 U | 2/2014 |
| CN | 104095587 A | 10/2014 |
| CN | 104216404 | 12/2014 |
| CN | 204016183 | 12/2014 |
| CN | 104302218 A | 1/2015 |
| CN | 104750105 | 7/2015 |
| CN | 104977926 | 10/2015 |
| CN | 205620809 U | 10/2016 |
| CN | 106660591 A | 5/2017 |
| CN | 207041464 U | 2/2018 |
| DE | 3730105 | 3/1989 |
| DE | 102007060750 A1 | 6/2009 |
| DE | 102015114775 | 3/2017 |
| EP | 0358628 | 3/1990 |
| EP | 0505028 | 9/1992 |
| EP | 3136196 | 3/2017 |
| JP | S59195711 | 11/1984 |
| JP | S62263507 | 11/1987 |
| JP | H0512958 | 1/1993 |
| JP | 2000353014 A | 12/2000 |
| JP | 2002318618 | 10/2002 |
| JP | 2013016206 | 1/2013 |
| JP | 2014097235 | 5/2014 |
| JP | 2014137694 | 7/2014 |
| JP | 2015016008 A | 1/2015 |
| JP | 2015515922 | 6/2015 |
| JP | 2015156107 | 8/2015 |
| JP | 2015207206 | 11/2015 |
| JP | 2016168467 A | 9/2016 |
| JP | 2017153787 | 9/2017 |
| JP | 2018506312 | 3/2018 |
| KR | 940006561 | 7/1994 |
| KR | 20020080900 | 10/2002 |
| KR | 20030013008 | 2/2003 |
| KR | 20070101479 | 10/2007 |
| KR | 20140123174 | 10/2014 |
| WO | 9303399 | 2/1993 |
| WO | 0038026 | 6/2000 |
| WO | 2004006034 | 1/2004 |
| WO | 2014105220 A1 | 7/2014 |
| WO | 2016130187 | 8/2016 |
| WO | 2016130187 A1 | 8/2016 |

OTHER PUBLICATIONS

PCT Search Report and Written Opinion dated Nov. 14, 2018, received in corresponding PCT Application No. PCT/IB18/56190, 9 pgs.

PCT Search Report and Written Opinion dated Oct. 19, 2018, received in corresponding PCT Application No. PCT/US18/46218, 10 pgs.

(56) References Cited

OTHER PUBLICATIONS

PCT Search Report and Written Opinion dated Oct. 25, 2019, received in corresponding PCT Application No. PCT/US19/44717, 9 pgs.
Chinese Office Action with English translation dated Nov. 2, 2020, received in Chinese Patent Application No. 201910707044.0, 14 pages.
Australia Examination Report dated Nov. 10, 2020, received in Australian Patent Application No. 2018329459, 5 pages.
Chinese Office Action with English translation dated Jan. 5, 2021, received in Chinese Patent Application No. 201880064050.2, 10 pages.
Japanese Office Action with English translation dated Feb. 22, 2021, received in Japanese Patent Application No. 2020508492, 14 pages.
Chinese Office Action with English translation dated Feb. 23, 2021, received in Chinese Patent Application No. 201880058937.0, 12 pages.
Canadian Office Action dated Apr. 1, 2021, received in Canadian Application No. 3,074,702, 5 pgs.
Japanese Office Action dated May 28, 2021, received in Japanese Patent Application No. 2020-513324, 16 pages.
Chinese Office Action with English translation dated Jul. 13, 2021, received in Chinese Patent Application No. 201910707044.0, 106 pages.
European Extended Search Report dated Jul. 26, 2021, received in European Patent Application No. 18854359.9, 10 pages.
European Extended Search Report dated Aug. 10, 2021, received in European Patent Application No. 18846451.5, 8 pages.
U.S. Office Action dated May 14, 2020, received in U.S. Appl. No. 16/100,687, 18 pages.
Korean Office Action dated Aug. 23, 2021 with English translation, received in Korean Patent Application No. 10-2020-7009963, 13 pages.
English translation of Decision of Rejection dated Sep. 2, 2021, received in JP Patent Application No. 2020-508492, 8 pgs.
Chinese Office Action with English translation dated Sep. 24, 2021, received in Chinese Patent Application No. 201880064050.2, 11 pages.
Australian Office Action dated Nov. 26, 2021, received in Australian Patent Application No. 2019312668, 3 pages.
Chinese Decision of Rejection with English translation ated Jan. 6, 2022, received in Chinese Patent Application No. 201910707044.0, 9 pages.
Canadian Office Action dated Sep. 16, 2021, received in Canadian Patent Application No. 3,074,702, 3 pages.
Japanese Office Action with English translation dated Feb. 1, 2022, received in Japanese Patent Application No. 2020513324, 11 pages.
Korean Office Action with English translation dated Apr. 15, 2022, received in Korean Patent Application No. 10-2021-7005845, 16 pages.
European Examination Report dated May 23, 2022, received in European Patent Application No. 18854359.9, 4 pages.
European Extended Search Report dated May 13, 2022, received in European Patent Application No. 19843316.1, 8 pages.
Ciccimaro, Dominic et al., "Automated security response robot", Proc. SPIE 3525, Mobile Robots XIII and Intelligent Transportation Systems, SPAWAR Systems Center, Code D371, San Diego, CA, (Jan. 8, 1999); doi: 10.1117/12.335728, 13 pages.
Roth, H. et al., "Control Strategies for Mobile Robots Based on Fuzzy Logic," Institute for Angewandte Forschungm, Weingarten, Germany, IEEE, 1995, 8 pages.
Japanese Office Action with English translation dated Aug. 30, 2022, received in Japanese Patent Application No. 2021-137127, 8 pages.
Korean Office Action with English translation dated Nov. 15, 2022, received in Korean Patent Application No. 10-2021-7005845, 8 pages.

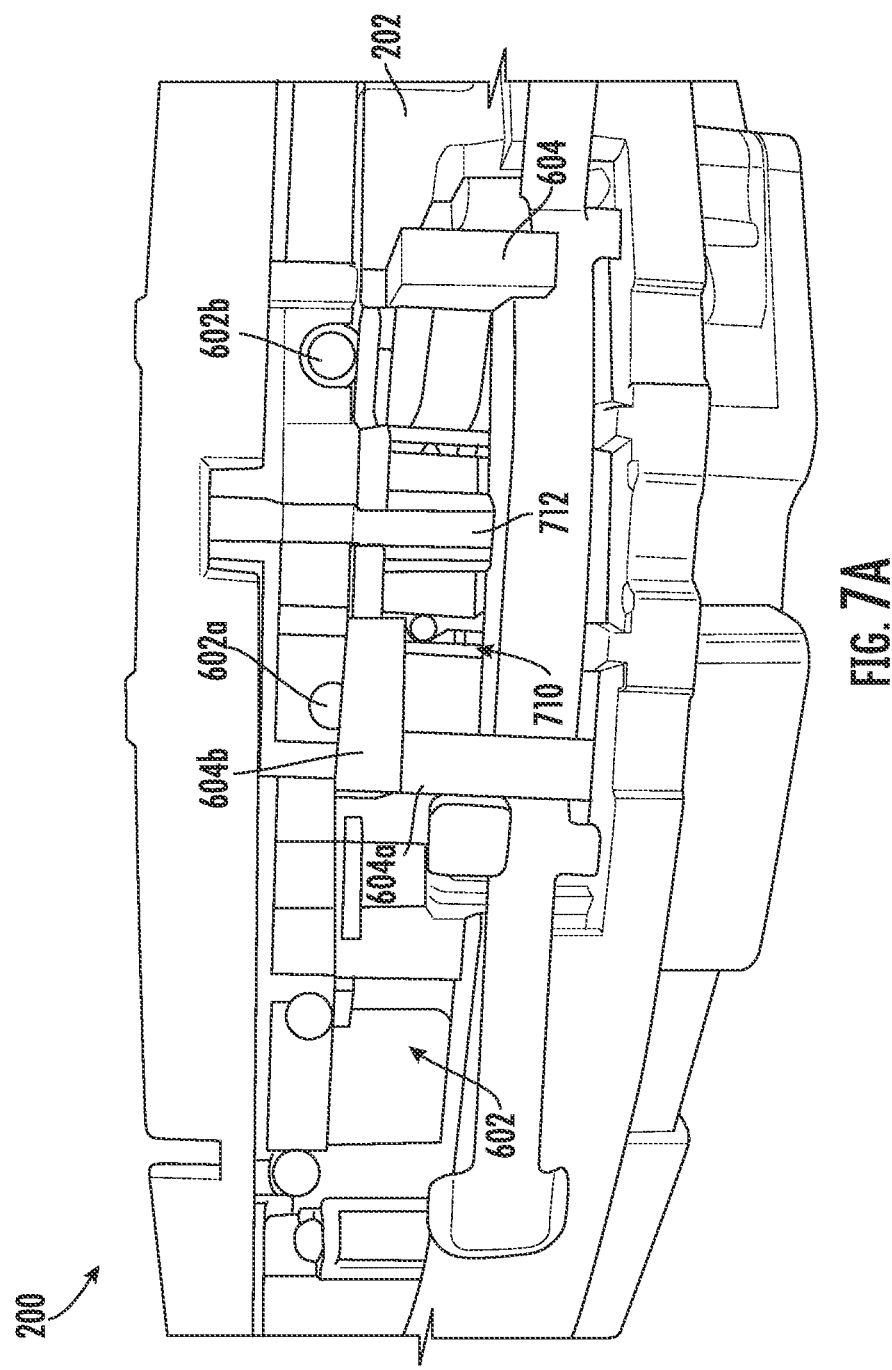

ROBOTIC VACUUM CLEANER

CROSS-REFERENCE TO RELATED APPLICATIONS

The present application claims the benefit of U.S. Provisional Application Ser. No. 62/713,207 filed on Aug. 1, 2018, entitled Robotic Vacuum Cleaner, which is fully incorporated herein by reference.

TECHNICAL FIELD

The present disclosure is generally directed to surface treatment apparatuses and more specifically to a robotic cleaner.

BACKGROUND INFORMATION

Surface treatment apparatuses can include robotic cleaners. A robotic cleaner is configured to autonomously travel about a surface while collecting debris left on the surface. A robotic cleaner can be configured to travel along a surface according to a random and/or predetermined path. When traveling along a surface according to the random path, the robotic cleaner may adjust its travel path in response to encountering one or more obstacles. When traveling along a surface according to a predetermined path, the robotic cleaner may have, in prior operations, developed a map of the area to be cleaned and travel about the area according to a predetermined path based on the map. Regardless of whether the robotic cleaner is configured to travel according to a random or predetermined path, the robotic cleaner may be configured to travel in predetermined patterns. For example, a robotic cleaner may be positioned in a location of increased debris and be caused to enter a cleaning pattern that causes the robotic cleaner to remain in the location of increased debris for a predetermined time.

BRIEF DESCRIPTION OF THE DRAWINGS

These and other features and advantages will be better understood by reading the following detailed description, taken together with the drawings, wherein:

FIG. 7A is magnified view of an example of the robotic vacuum cleaner of FIG. 2 having the displaceable bumper removed therefrom, consistent with embodiments of the present disclosure.

DETAILED DESCRIPTION

The present disclosure is generally directed to a robotic cleaner (e.g., a robotic vacuum cleaner). The robotic cleaner may include a suction motor configured to generate suction at an air inlet, at least one side brush configured to urge debris on a surface towards the air inlet, a dust cup for collecting debris urged into the air inlet, a sensor system for detecting one or more obstacles, and a user interface for receiving one or more user inputs. The sensor system can include a displaceable bumper that extends around at least a portion of the perimeter of the robotic cleaner. A plurality of obstacle sensors can be disposed behind the bumper and configured to emit a signal (e.g., an optical or acoustic signal) through the bumper such that the obstacle sensors can detect obstacles before the bumper contacts a respective obstacle.

Each of the plurality of obstacle sensors may include an emitter and a detector. In operation, a portion of a signal emitted by a corresponding emitter may be inadvertently reflected from an inner surface of the displaceable bumper. The reflected signal may be received by the emitter and the received reflected signal may have an intensity that is in excess of an obstacle detection threshold. As a result, the detector may incorrectly indicate that an obstacle is present. A divider (e.g., a compressible foam) may be positioned between the emitter and detector, wherein the divider is configured to absorb at least a portion of the reflected signal. As such, the reflected signal may be prevented from being incident on the detector or the intensity of the reflected signal may be reduced such that it is below the obstacle detection threshold.

An overhanging obstacle as used herein may generally refer to an obstacle, wherein at least a portion of the obstacle extends over and is spaced apart from a surface on which the robotic cleaner travels. An example of an overhanging obstacle may include a portion of a couch or coffee table that extends between two legs. A forward obstacle as used herein may generally refer to obstacle, wherein the obstacle extends from a surface on which the robotic cleaner travels. An example of a forward obstacle may include a leg of a chair or a wall.

Figure 1A:
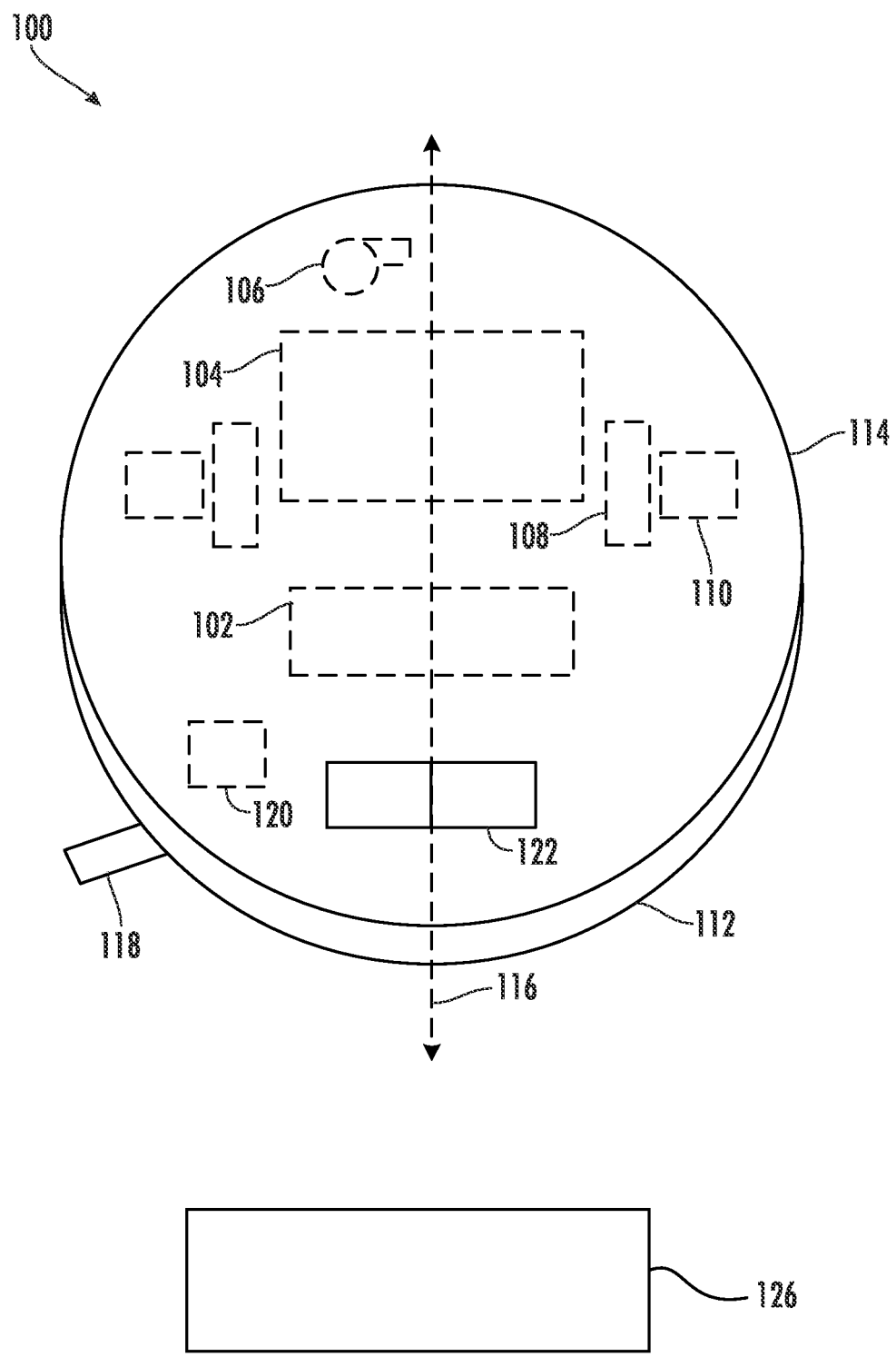
FIG. 1A is a schematic view of an example of a robotic vacuum cleaner and robotic cleaner docking station, consistent with embodiments of the present disclosure.

FIG. 1A shows a schematic view of an example of a robotic cleaner 100 (e.g., a robotic vacuum cleaner). As shown, the robotic cleaner 100 includes an air inlet 102 fluidly coupled to a dust cup 104 and a suction motor 106. The suction motor 106 causes debris to be suctioned into the air inlet 102 and deposited into the dust cup 104 for later disposal.

As also shown, the robotic cleaner 100 includes a plurality of wheels 108 coupled to a respective drive motor 110. As such, each wheel 108 may generally be described as being independently driven. The robotic cleaner 100 can be steered by adjusting the rotational speed of one of the plurality of wheels 108 relative to the other of the plurality of wheels 108.

A displaceable bumper 112 can be disposed along a portion of a perimeter defined by a housing 114 of the robotic cleaner 100. The displaceable bumper 112 is configured to transition between an unactuated position and an actuated position in response to engaging, for example, an obstacle. The displaceable bumper 112 can be configured to be moveable along a first axis 116 extending generally parallel to a top surface of the housing 114. As such, the displaceable bumper 112 is displaced in response to engaging (e.g., contacting) at least a portion of an obstacle disposed on and extending from a surface to be cleaned (e.g., a forward obstacle). Additionally, or alternatively, the displaceable bumper 112 can be configured to be moveable along a second axis that extends transverse to (e.g., perpendicular to) the first axis 116. As such, the displaceable bumper 112 is displaced in response to engaging (e.g., contacting) at least a portion of an obstacle that is spaced apart from the surface to be cleaned (e.g., an overhanging obstacle). Therefore, the robotic cleaner 100 may avoid becoming trapped between the obstacle and the surface to be cleaned. The robotic cleaner 100 can be configured to determine along which axis the displaceable bumper 112 is displaced. Such a configuration, may allow the robotic cleaner 100 to carry out different obstacle detection behaviors based, at least in part, on the location of the obstacle relative to the robotic cleaner 100. As such, the robotic cleaner 100 can have different behaviors based on whether the detected obstacle is an overhanging obstacle or a forward obstacle.

One or more side brushes 118 can be positioned such that a portion of the side brush 118 extends at least to (e.g., beyond) the perimeter defined by the housing 114 of the robotic cleaner 100. The side brush 118 can be configured to urge debris in a direction of the air inlet 102 such that debris located beyond the perimeter of the housing 114 can be collected. For example, the side brush 118 can be configured to rotate in response to activation of a side brush motor 120.

A user interface 122 can be provided to allow a user to control the robotic cleaner 100. For example, the user interface 122 may include one or more push buttons that correspond to one or more features of the robotic cleaner 100. Liquid ingress protection may be provided at the user interface 122 to prevent or otherwise mitigate the effects of a liquid inadvertently spilled on the housing 114 of the robotic cleaner 100.

In some instances, the robotic cleaner 100 may include a gyroscopic sensor 124. The gyroscopic sensor 124 can be configured to detect a velocity and an orientation of the robotic cleaner 100. The orientation of the robotic cleaner 100 may be calculated relative to a known starting location such as, for example, a robotic cleaner docking station 126. The velocity of the robotic cleaner 100 may be used to calculate a travel distance of the robotic cleaner 100. Based on the distance traveled and the orientation of the robotic cleaner 100, the robotic cleaner 100 can be configured to estimate (e.g., using a controller) a return path to its starting location (e.g., the docking station 126).

Figure 1B:
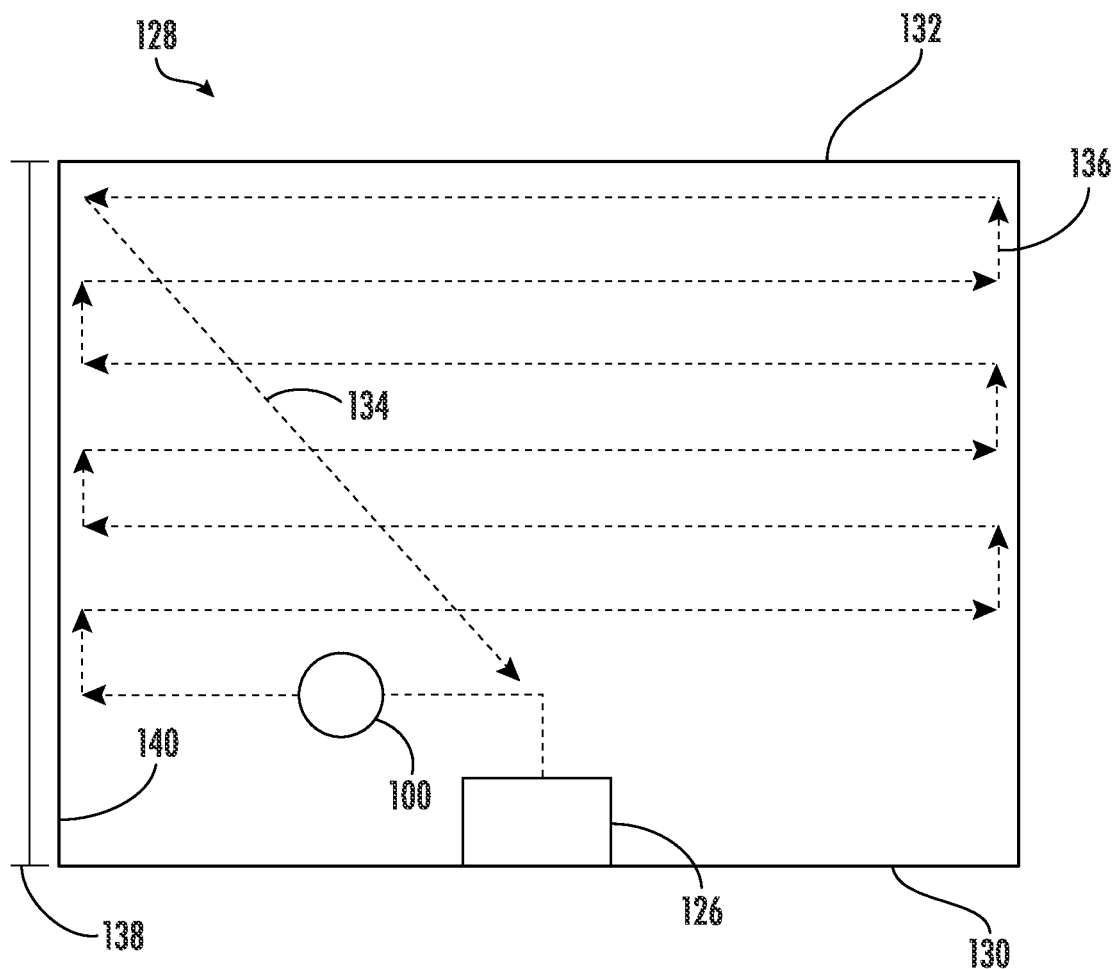
FIG. 1B is a schematic example of the robotic cleaner of FIG. 1A moving in a room according to a cleaning pattern, consistent with embodiments of the present disclosure.

For example, and as shown in FIG. 1B, in a substantially rectangular room 128 having the docking station 126 on a first end wall 130 of the room 128, the robotic cleaner 100 can estimate a return path 134 to the docking station 126 when it reaches a second end wall 132 of the room, the second end wall 132 being opposite the first end wall 130. In this example, the robotic cleaner 100 may travel according to a predetermined cleaning pattern 136 (e.g., along parallel paths extending generally parallel to the first and second end walls 130 and 132 of the room 128). Based on the number of orientation changes (e.g., turns substantially equal to 180°) and a width of the robotic cleaner 100, the robotic cleaner 100 may estimate a measure of a length 138 of the room extending between the first and second end walls 130 and 132. Using the velocity data, the robotic cleaner 100 may estimate a measure of a distance traveled along the portion of the cleaning pattern 136 extending from the starting location (e.g., the docking station 126) to a first sidewall 140 of the room (e.g., the robotic cleaner 100 may be configured to turn 90° upon leaving the docking station 126 and travel until contacting the first sidewall 140), wherein the first sidewall 140 extends between and generally perpendicular to the first and second end walls 130 and 132 of the room 128. Based on the measure of the length 138 of the room 128 and the distance traveled to the first sidewall 140 from the docking station 126, the robotic cleaner 100 may be configured to estimate the return path 134 using, for example, trigonometric functions. The return path 134 may be configured to position the robotic cleaner 100 at a location proximate to, for example, the docking station 126 such that the robotic cleaner 100 can detect one or more docking signals emitted from the docking station 126.

In some instances, the gyroscopic sensor 124 is configured detect an orientation of the robotic cleaner 100 when traveling. The robotic cleaner 100 can be configured to compare the detected orientation (e.g., using a controller) to a desired orientation and adjust its orientation if the detected orientation is not substantially the same as the desired orientation (e.g., within 5%, 10%, 15%, 25% and/or any other acceptable amount of the desired orientation). As such, the robotic cleaner 100 can be configured to move according to paths based, at least in part, on data output from the gyroscopic sensor 124. For example, the detected orientation can be compared to the desired orientation and a movement path of the robotic cleaner 100 can be adjusted based, at least in part, on the comparison such that the robotic cleaner 100 moves between opposing sidewalls of a room according to substantially parallel movement paths (e.g., the cleaning pattern 136 as shown in FIG. 1B). If an object is encountered when traveling according to the substantially parallel paths, the robotic cleaner 100 may be configured to turn and travel away from the object in the opposite direction. In these instances, if the detected travel distance between an immediately prior turn and the object measures less than the estimated width of the room, the robotic cleaner 100 may identify the encountered object as an obstacle. If identified as an obstacle, the robotic cleaner 100 may enter into an obstacle following behavior such that the robotic cleaner 100 can reach an opposing side of the obstacle and clean the area extending between the opposing side of the obstacle and an opposing sidewall of the room.

In some instances, an estimated distance traveled calculated using the gyroscopic sensor 124 may be compared to one or more distance traveled estimates calculated using one or more additional sensors. For example, an estimated distance traveled calculated using the gyroscopic sensor 124 may be compared to an estimated distance traveled calculated using a wheel rotation sensor. In this example, the estimated distance traveled calculated using the gyroscopic sensor 124 may be used to verify an accuracy of a distance traveled estimate obtained using data from the wheel rotation sensor. In some instances, an estimated overall distance traveled may be estimated based, at least in part, on the distance estimate obtained using the gyroscopic sensor 124 and another sensor (e.g., a wheel rotation sensor). For example, an average value of the estimated travel distances may be calculated.

Figure 2:
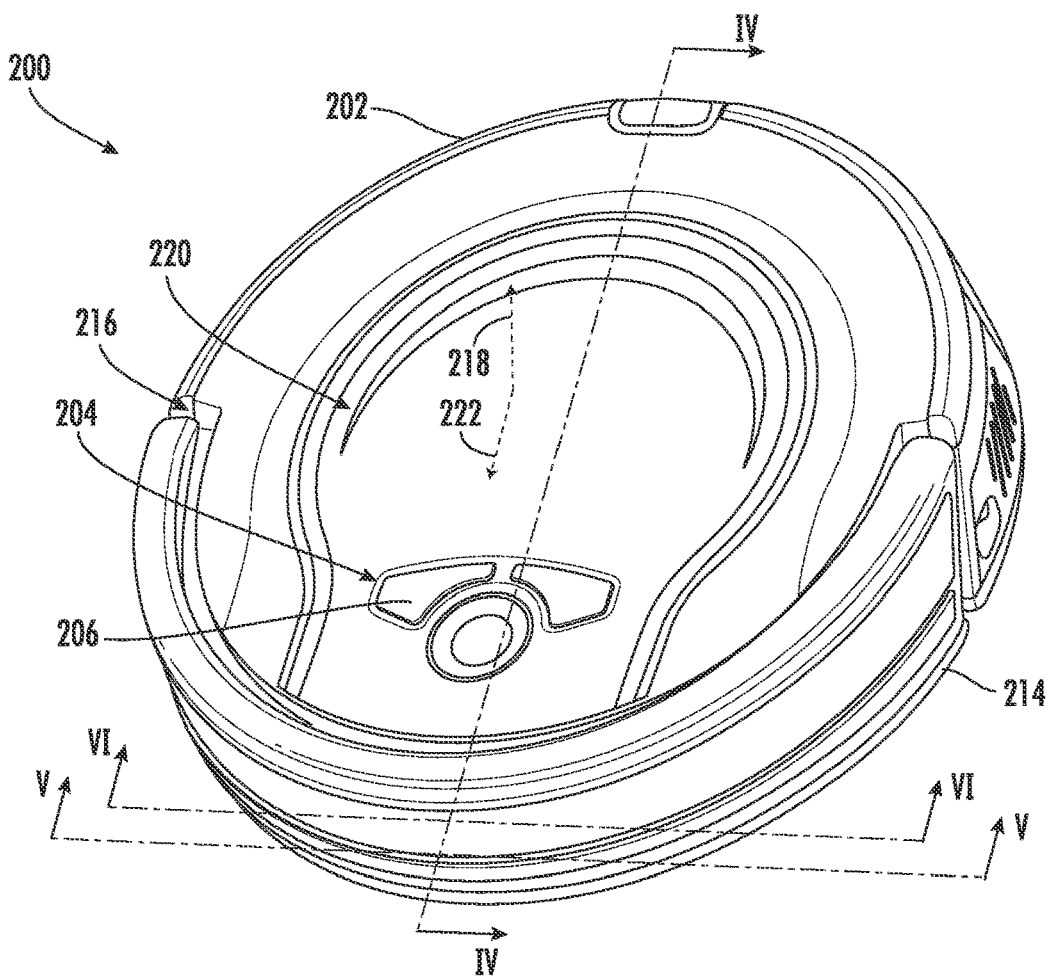
FIG. 2 is a perspective view of an example of a robotic vacuum cleaner, consistent with embodiments of the present disclosure.
Figure 3:
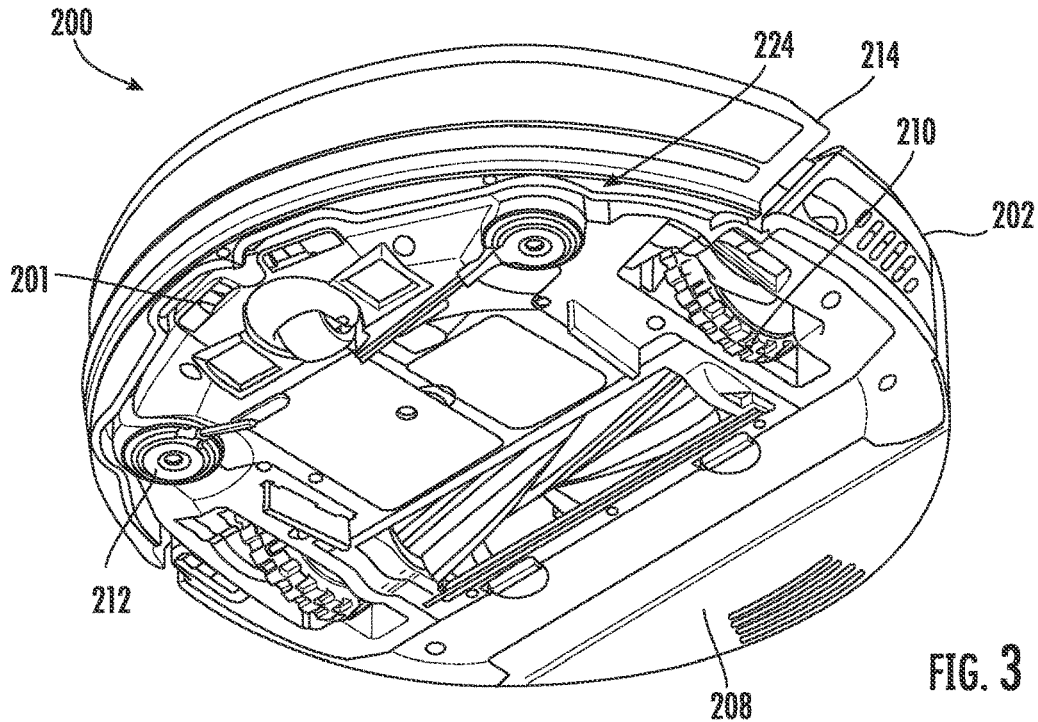
FIG. 3 is another perspective view of the robotic vacuum cleaner of FIG. 2, consistent with embodiments of the present disclosure.

FIGS. 2 and 3 show perspective views of a robotic vacuum cleaner 200, which may be an example of the robotic vacuum cleaner of FIG. 1A. FIG. 2 shows a top perspective view of the robotic vacuum cleaner 200 and FIG. 3 shows a bottom perspective view of the robotic vacuum cleaner 200. As shown, the robotic vacuum cleaner 200 includes a housing 202, a user interface 204 having a plurality of buttons 206, a dust cup 208, a plurality of drive wheels 210, and a plurality of side brushes 212.

A displaceable bumper 214 is movably coupled to and extends around at least a portion of a perimeter 216 of the housing 202 (e.g., around a front half of the housing 202). The displaceable bumper 214 is configured to be displaced along at least one axis. In some instances, the displaceable bumper 214 is configured to be displaced along at least two axes. For example, the displaceable bumper 214 can be configured to move along a vertical axis 218 that extends generally perpendicular to a top surface 220 of the housing 202 and along a horizontal axis 222 that extends generally parallel to a top surface 220 of the housing 202. When the displaceable bumper 214 is displaced along the vertical axis 218 in response to, for example, engaging (e.g., contacting) an overhanging obstacle (e.g., a portion of a couch extending between two legs), the displaceable bumper 214 causes one or more switches to be actuated. For example, one or more optical break switches/light gates (e.g., an infrared break-beam sensor), mechanical pushbutton switches, and/or any other switch can be positioned along a portion of the top surface 220 of the housing 202 and configured to engage (e.g., contact) the displaceable bumper 214. At least a portion of the displaceable bumper 214 may extend above the housing 202 such that at least a portion of the displaceable bumper 214 represents the highest point on the robotic vacuum cleaner 200. As such, displaceable bumper 214 is urged towards the housing 202 in response to engaging an overhanging obstacle without the overhanging obstacle directly contacting the top surface 220 of the housing 202. Such a configuration may prevent the robotic vacuum cleaner 200 from becoming stuck between the overhanging obstacle and a surface being traveled on (e.g., a floor).

When the displaceable bumper 214 is displaced along the horizontal axis 222 in response to, for example, engaging (e.g., contacting) a forward obstacle (e.g., an obstacle extending from a floor such as a wall or a leg of a chair), the displaceable bumper 214 may cause one or more switches to be actuated. For example, one or more optical break switches/light gates (e.g., an infrared break-beam sensor), mechanical pushbutton switches, and/or any other switch may be positioned around the peripheral surface 224 of the housing 202.

In some instances, the robotic vacuum cleaner 200 can be configured to detect whether the displaceable bumper 214 is displaced vertically, horizontally, or both in order to determine a behavior (e.g., an obstacle avoidance behavior). In some instances, the robotic vacuum cleaner 200 can be configured to determine a fault condition (e.g., the displaceable bumper is stuck in a displaced condition) based, at least in part, on the displaceable bumper 214 being displaced along one or more axes in excess of a predetermined period of time.

Figure 4:
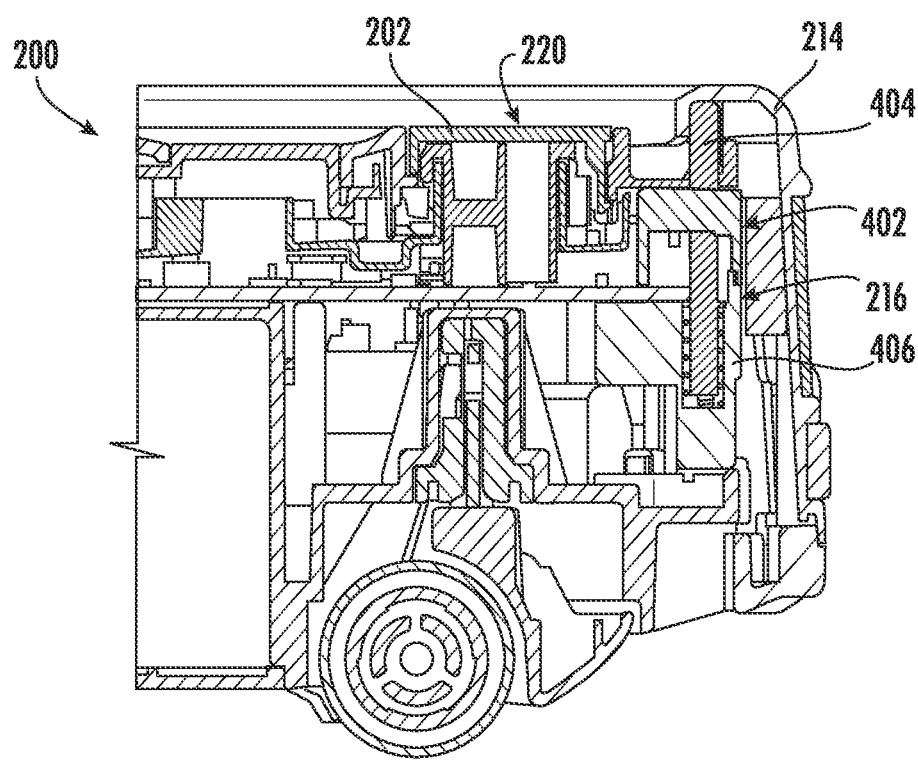
FIG. 4 is a cross-sectional view of the robotic vacuum cleaner of FIG. 2 taken along the line IV-IV, consistent with embodiments of the present disclosure.

FIG. 4 is a cross-sectional view of a portion of the robotic vacuum cleaner 200 taken along the line IV-IV of FIG. 3. FIG. 4 shows an example of the displaceable bumper 214 being configured to actuate an upper optical break switch (or light gate) 402 in response to the displaceable bumper 214 being displaced as a result of engaging, for example, an overhanging obstacle. As shown, the displaceable bumper 214 is configured to engage (e.g., contact) a plunger portion 404 of the upper optical break switch 402. The plunger portion 404 is configured to be biased (e.g., by a spring 406) in direction towards the top surface 220 of the housing 202. As such, the plunger portion 404 (or more generally the upper optical break switch 402) can generally be described as supporting the displaceable bumper 214 in a position spaced apart from the top surface 220 of the housing 202. When the plunger portion 404 is urged into the housing 202 in response to the displacement of the displaceable bumper 214, the plunger portion 404 causes an optical beam within the upper optical break switch 402 to be broken, actuating the upper optical break switch 402. In some instances, a plurality (e.g., at least two, at least three, at least four, at least five, or any other suitable number) of upper optical break switches 402 may be disposed around the perimeter 216 of the housing 202. In some instances, the robotic vacuum cleaner 200 can be configured to carry out various behaviors based, at least in part, on an activation sequence of the plurality of upper optical break switches 402 and/or on which of the plurality of upper optical break switches 402 are activated. In other words, actuation of individual upper optical break switches can be detected. For example, detection of the actuation of individual switches may allow the robotic vacuum cleaner 200 to determine a location of an overhanging obstacle relative to the robotic vacuum cleaner 200.

Figure 5:
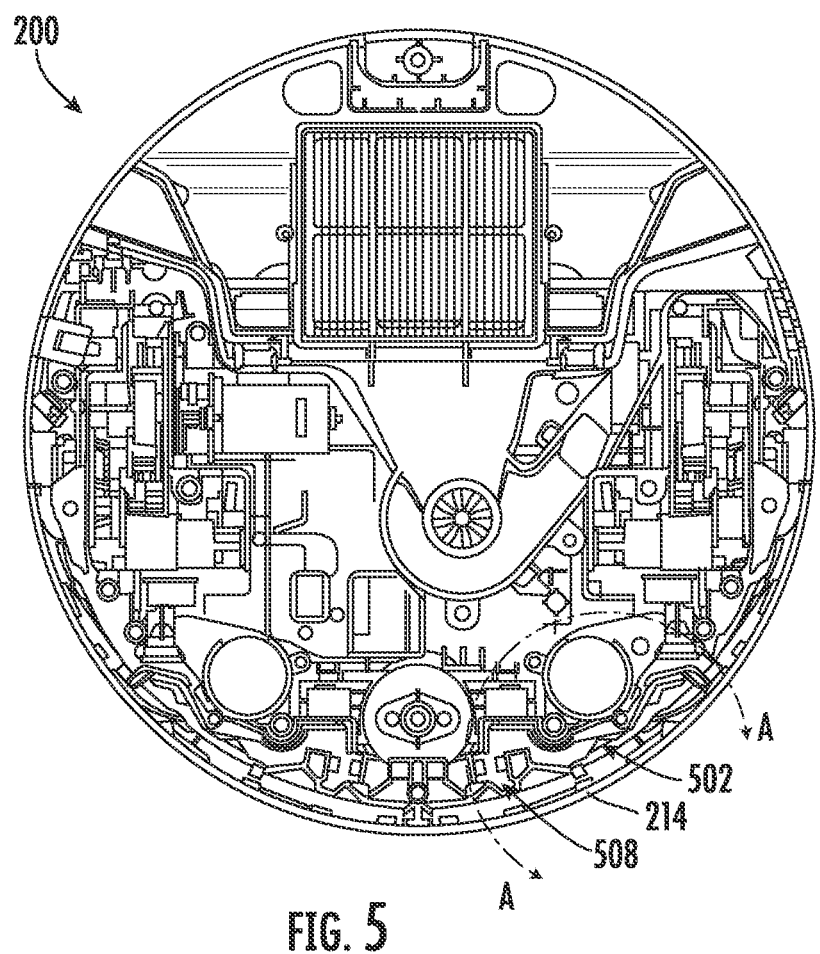
FIG. 5 is a cross-sectional view of the robotic vacuum cleaner of FIG. 2 taken along the line V-V, consistent with embodiments of the present disclosure.
Figure 5A:
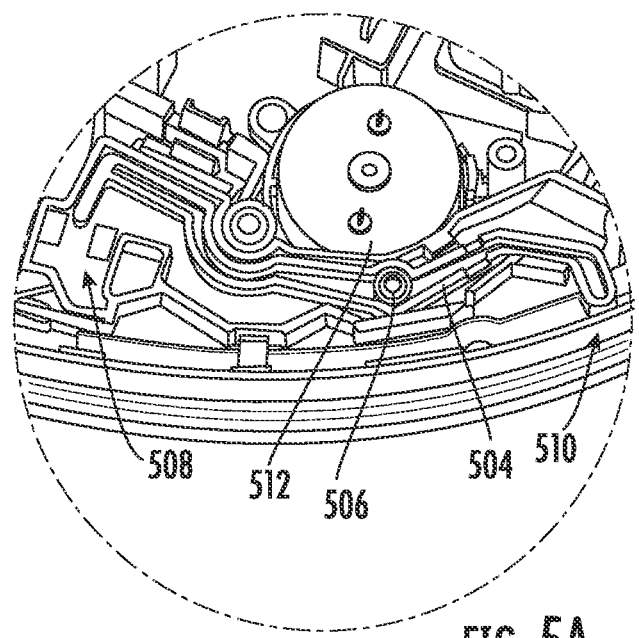
FIG. 5A is a magnified perspective view corresponding to region A of FIG. 5, consistent with embodiments of the present disclosure.

FIG. 5 is a cross-sectional view of the robotic vacuum cleaner 200 taken along the line V-V of FIG. 3 and FIG. 5A shows a magnified perspective view corresponding to region A of FIG. 5. FIG. 5 shows an example of the displaceable bumper 214 being configured to actuate a forward optical break switch (or light gate) 502 in response to the displaceable bumper 214 engaging an obstacle extending from a surface to be cleaned. When the displaceable bumper 214 is displaced rearwardly, the displaceable bumper 214 causes a pivot arm 504 of the forward optical break switch 502 to pivot about a pivot point 506. As the pivot arm 504 pivots, a portion of the pivot arm 504 breaks a light beam extending between an emitter/detector pair 508 of the forward optical break switch 502. As shown, the forward optical break switch 502 and an actuation end 510 of the pivot arm 504 are disposed on opposing sides of the pivot point 506. The actuation end 510 is configured to engage (e.g., contact) the displaceable bumper 214. In some instances, the robotic vacuum cleaner 200 includes a plurality of forward optical break switches 502, wherein the robotic vacuum cleaner 200 is configured to detect an actuation of each of the forward optical break switches 502 separately. Such a configuration may allow the robotic vacuum cleaner 200 to determine a location of a forward obstacle relative to the robotic vacuum cleaner 200.

The pivot arm 504 can be biased by a biasing mechanism 512 (e.g., a spring such as a torsion spring). For example, the biasing mechanism 512 may urge the actuation end 510 in a direction of the displaceable bumper 214.

Figure 6:
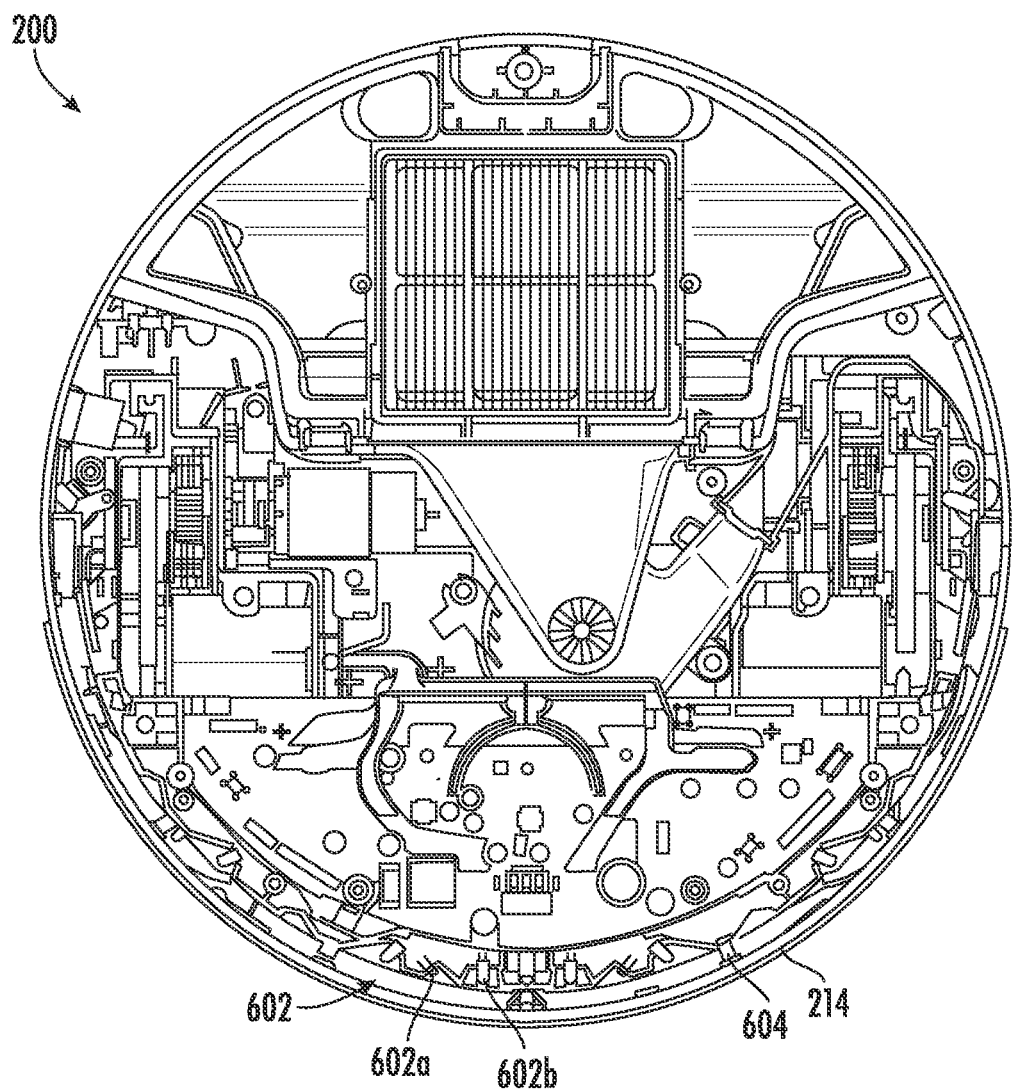
FIG. 6 is a cross-sectional view of the robotic vacuum cleaner of FIG. 2 taken along the line VI-VI, consistent with embodiments of the present disclosure.

FIG. 6 is a cross-sectional view of the robotic vacuum cleaner 200 taken along the line VI-VI of FIG. 3. As shown, a plurality of obstacle detection emitter/detector pairs (or obstacle sensors) 602 are disposed along the perimeter 216 of the housing 202. Each obstacle detection emitter/detector pair 602 includes a light emitter 602a and a light detector 602b. Each emitter 602a of the obstacle detection emitter/detector pairs 602 is configured to emit light (e.g., infrared light) through at least a portion of the displaceable bumper 214 and into an environment surrounding the robotic vacuum cleaner 200. The emitted light is reflected off obstacles in the environment and a portion of the reflected light passes through at a portion of the displaceable bumper 214 to be received by a respective light detector 602b of the obstacle detection emitter/detector pairs 602.

In some instances, a portion of the light emitted by a respective light emitter 602a of the emitter/detector pairs 602 may reflect off a portion of the displaceable bumper 214 instead of passing through the displaceable bumper 214. The light reflected from the displaceable bumper 214 may be received by the detector 602b of a respective emitter/detector pair 602. As a result, the detector 602b may incorrectly indicate an obstacle is present (e.g., the intensity of the internally reflected light may exceed a threshold set for obstacle detection), which may cause the robotic vacuum cleaner 200 to inadvertently enter into an obstacle avoidance behavior. In other words, light reflected from the displaceable bumper 214 may generally be described as causing in interference and/or cross-talk.

In order to reduce and/or prevent the interference and/or cross-talk between an emitter and detector of a respective emitter/detector pair 602, a divider 604 can be disposed between the emitter 602a and detector 602b of a respective emitter/detector pair 602. As such, a plurality of dividers 604 can be arranged around the perimeter 216 of the housing 202 and extend between the displaceable bumper 214 and the housing 202. Each divider 604 can be resiliently compressible (e.g., the dividers 604 are configured to repeatedly compress and expand) such that the dividers 604 are compressed when the displaceable bumper 214 engages (e.g., contacts) an obstacle. The dividers 604 can also be configured to absorb and/or block the transmission of at least a portion of light that is incident thereon. In some instances, the dividers 604 may include a foam material (e.g., an ethylene propylene diene terpolymer foam) that is configured to compress in response to a displacement of the displaceable bumper 214.

In some instances, each emitter 602a of the emitter/detector pairs 602 can be modulated according to a modulation pattern. The modulation pattern can cause each emitter 602a of a respective emitter/detector pair 602 to emit at a predetermined time. The predetermined times may be selected such that at least two of the emitters 602a of the emitter/detector pairs 602 emit at different times. Such a configuration may reduce the effects of interference and/or cross-talk between emitter/detector pairs 602. Additionally, or alternatively, each detector 602b of the emitter/detector pairs 602 can be configured such that a detection signal is generated only after a predetermined time period (e.g., one millisecond, two milliseconds, three milliseconds, one second, and/or any other time period) has lapsed between when the emitter 602a has emitted light and light is received by the detector 602b. In other words, the detector 602b can be configured to ignore light incident thereon for a predetermined time period. Such a configuration may reduce the effects of interference and/or cross-talk caused by reflection of light off a surface of the displaceable bumper 214.

Figure 7:
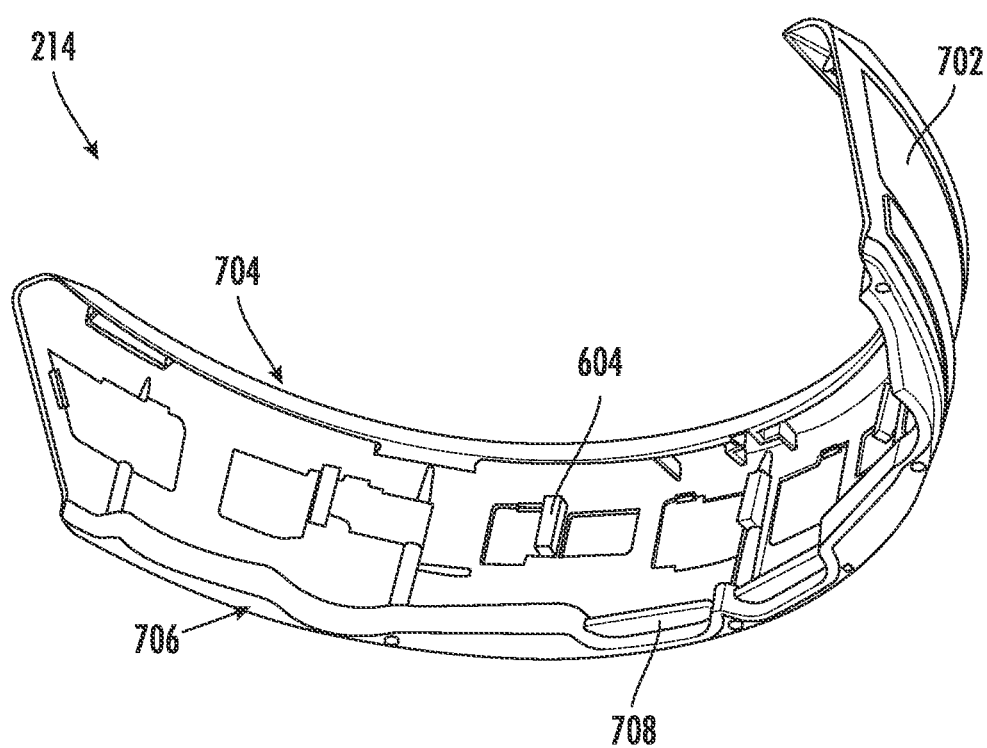
FIG. 7 is a perspective view of a displaceable bumper configured to be used with the robotic vacuum cleaner of FIG. 2, consistent with embodiments of the present disclosure.

FIG. 7 shows a bottom perspective view of the displaceable bumper 214 separated from the robotic vacuum cleaner 200. As shown, the displaceable bumper 214 includes a transparent portion 702 extending along the displaceable bumper 214 and configured to allow light emitted by the emitters 602a of the emitter/detector pairs 602 to pass therethrough. For example, the transparent portion 702 may be configured to be transparent to infrared (IR) light and absorb, reflect, and/or block all or a substantial portion of any non-IR light incident thereon.

As also shown, the dividers 604 can be coupled to the displaceable bumper 214 such that the dividers 604 extend between a top and bottom surface 704 and 706 of the displaceable bumper 214. For example, the dividers 604 may extend along only a portion of the displaceable bumper 214.

As also shown, the displaceable bumper 214 can include wipers 708 (e.g., a seal) that extend along at least a portion of an inside perimeter of the displaceable bumper 214 such that the wipers 708 extend between the displaceable bumper 214 and the housing 202. In other words, the wipers 708 extend from the displaceable bumper 214 in a direction of the housing 202. As such, the wipers 708 are flexible such that the wipers 708 can flex in response to movement of the displaceable bumper 214. The wipers 708 may reduce and/or prevent the ingress of debris at the gap formed between the housing 202 and the displaceable bumper 214. As such, the wipers 708 can be disposed proximate a bottom most portion of the displaceable bumper 214 (e.g., a portion of the displaceable bumper 214 proximate a surface being traveled on). For example, the wipers 708 may be disposed along a portion of the displaceable bumper 214 that corresponds to those locations having the greatest separation distance between the displaceable bumper 214 and the housing 202 (e.g., adjacent one or more downward facing sensors 201, see FIG. 3, of the robotic vacuum cleaner 200 configured to detect, for example, a change is surface elevation). Additionally, or alternatively, the wipers 708 may be configured to remove debris that has collected on a portion of the robotic vacuum cleaner 200 in response to movement of the displaceable bumper 214. For example, the wipers 708 may be configured to remove at least a portion of debris adhered to one or more downward facing sensors 201 (see FIG. 3). In some instances, the wipers 708 may include a plurality of bristles that define a brush.

In some instances, and as shown in FIG. 7A, one or more of the one or more dividers 604 are coupled to the housing 202 of the robotic vacuum cleaner 200. For example, the one or more dividers 604 may be positioned between a respective emitter 602a and detector 602b of a corresponding emitter/detector pair 602. Additionally, or alternatively, the dividers 604 may be coupled to the housing 202 such that the dividers 604 extend between a respective emitter/detector pair 602 and another optical component. For example, the robotic vacuum cleaner 200 may include one or more optical docking sensors 710 disposed within a shadowbox 712 (e.g., a housing configured to shape and/or direct light incident therein). In these instances, the dividers 604 can extend along at least a portion of one or more sides of the shadowbox 712. For example, the dividers 604 may extend along two or more sides of the shadowbox 712 such that a first divider 604a extends transverse (e.g., perpendicular) to a second divider 604b. Such a configuration may reduce interference between optical signals emitted from an emitter 602a and the one or more docking sensors 710.

Figure 8:
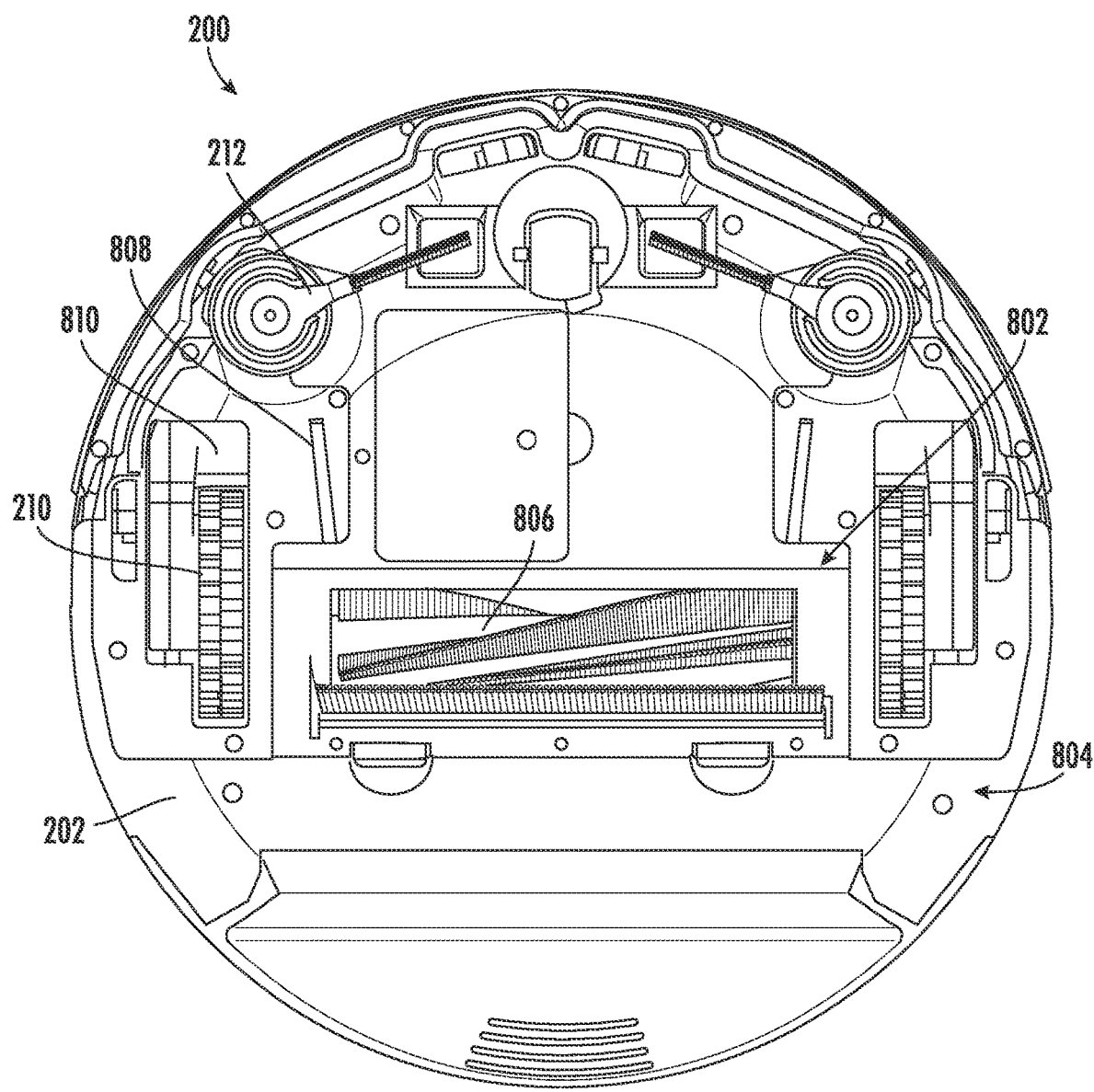
FIG. 8 is a bottom view of the robotic vacuum cleaner of FIG. 2, consistent with embodiments of the present disclosure.

FIG. 8 shows a bottom view of the robotic vacuum cleaner 200. As shown, the robotic vacuum cleaner 200 includes an air inlet 802 provided along a floor facing surface 804 of the robotic vacuum cleaner 200. An agitator 806 is provided within the air inlet 802 and configured to engage a surface (e.g., a floor). For example, the agitator 806 can be configured to rotate such that at least a portion of the agitator 806 contacts a floor and disturbs debris resting on or adhered to the floor such that the debris can be suctioned into the air inlet 802.

The side brushes 212 can be configured to urge debris from beyond a periphery of the robotic vacuum cleaner 200 in a direction of the air inlet 802. The side brushes 212 can be configured to come into engagement (e.g., contact) with a respective side brush debris deflector 808 (e.g., bristle strip) arranged on opposing sides of the air inlet 802 and at location between the side brushes 212 and the air inlet 802. The side brush debris deflectors 808 extend from the floor facing surface 804 in a direction of a surface to be cleaned such that, for example, the side brush debris deflectors 808 contact the surface to be cleaned. The side brush debris deflectors 808 can be configured to urge debris collected by the side brushes 212 into the air inlet 802. For example, as the side brushes 212 rotate, debris is collected by and rotated with the side brushes 212. When the side brushes 212 engage (e.g., contact) respective debris deflectors 808, the debris collected by the side brushes 212 is collected by the debris deflectors 808 and urged towards the air inlet 802. As such, at least a portion of the debris collected by the side brushes 212 is prevented from being urged beyond a periphery of the robotic vacuum cleaner 200 by the side brushes 212.

The side brush debris deflectors 808 can be removably coupled to a respective wheel housing 810. Each wheel housing 810 can include a respective drive wheel 210 and a drive motor configured to drive the respective drive wheel 210. Each wheel housing 810 is removably coupled to the housing 202 of the robotic vacuum cleaner 200. As such, when the wheel housing 810 is removed from the housing 202 of the robotic vacuum cleaner 200, the corresponding side brush debris deflector 808 is removed with the wheel housing 810. In some instances, when the wheel housing 810 is removed, the corresponding side brush debris deflector 808 can be replaced.

Figure 9:
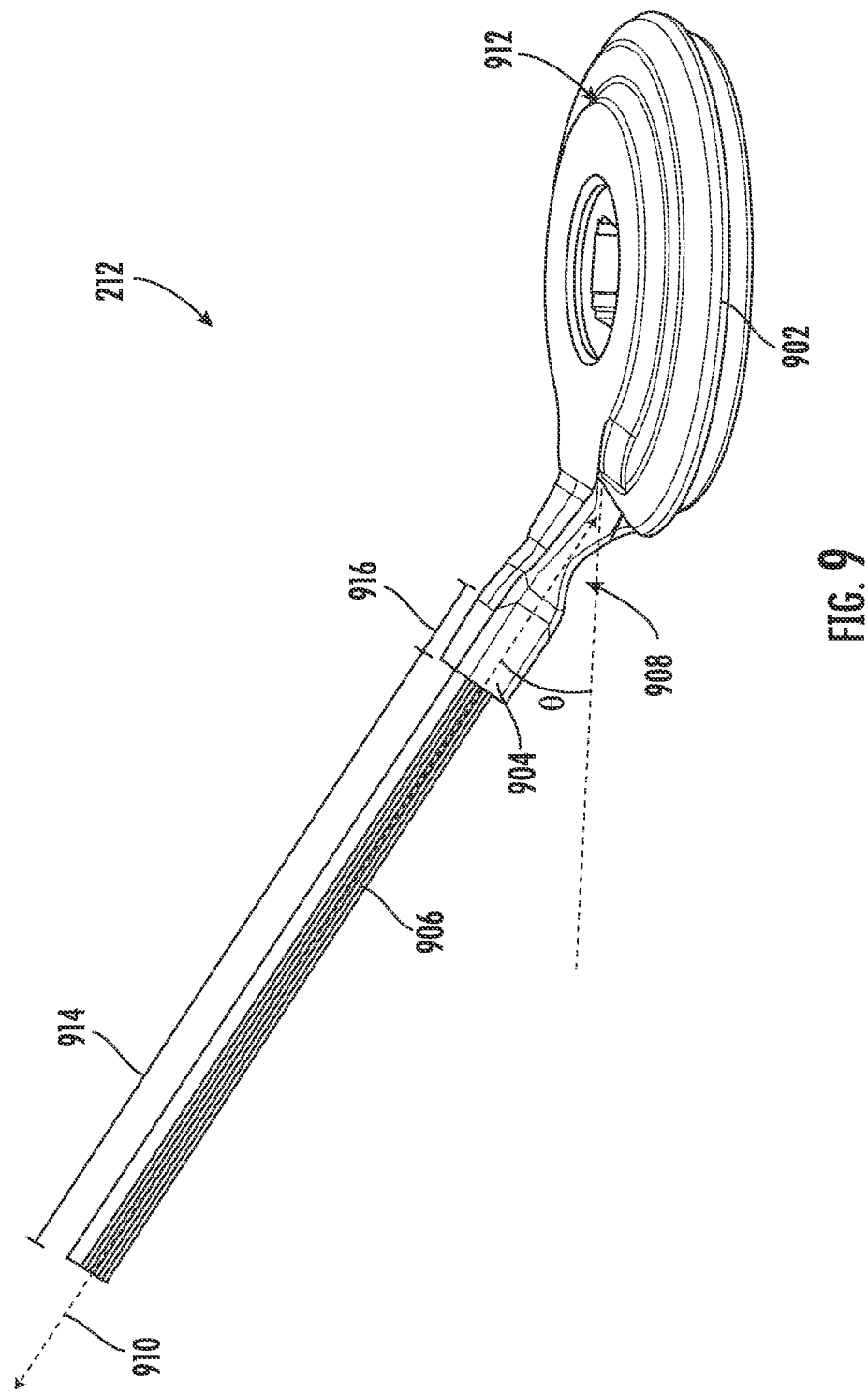
FIG. 9 is a perspective view of a side brush configured to be used with the robotic vacuum cleaner of FIG. 2, consistent with embodiments of the present disclosure.

FIG. 9 shows a perspective view of the side brush 212. As shown, the side brush 212 includes a hub 902 having a flexible protrusion 904 extending therefrom. The flexible protrusion 904 includes a plurality of bristles 906 extending from an end of the protrusion 904. As shown, the flexible protrusion 904 also includes a necked region 908 extending between the bristles 906 and the hub 902. The necked region 908 may increase the flexibility of the protrusion 904. As such, a greater portion of the bristles 906 may engage a surface to be cleaned. For example, the necked region 908 can be configured such that the protrusion 904 bends approximately 180° in a plane generally parallel to a top surface 912 of the hub 902 (or surface to be cleaned) and bends approximately 270° in a plane generally perpendicular to the top surface 912 of the hub 902 (or surface to be cleaned).

The bristles 906 and the protrusion 904 can be configured such that a central axis 910 of the bristles 906 and the protrusion 904 form an angle θ with the top surface 912 of the hub 902. For example, the angle θ can measure in a range of 15° to 45°. In some instances, the angle θ can measure 30°. When the bristles 906 engage (e.g., contact) a surface to be cleaned, the angle θ may decrease as the protrusion 904 and/or the bristles 906 flex.

The protrusion 904 may be formed by over molding a flexible material over the hub 902. Over molding a flexible material over the hub 902 and including bristles 906 at an end of the protrusion 904 may increase the durability of the side brush 212 when compared to a hub having bristles extending therefrom. The bristles 906 can be coupled to the protrusion 904 using, for example, an adhesive. The bristles 906 may have an exposed length 914 (e.g., a length of the bristles 906 extending from the protrusion) that measures in a range of, for example, 25 millimeters (mm) to 75 mm and a coupling length 916 (e.g., a length corresponding to the portion of the bristles 906 received within the protrusion) that measures in a range of, for example, 2 mm to 9 mm. By way of further example, the exposed length 914 may measure 50 mm and the coupling length 916 may measure 5.5 mm.

Figure 10:
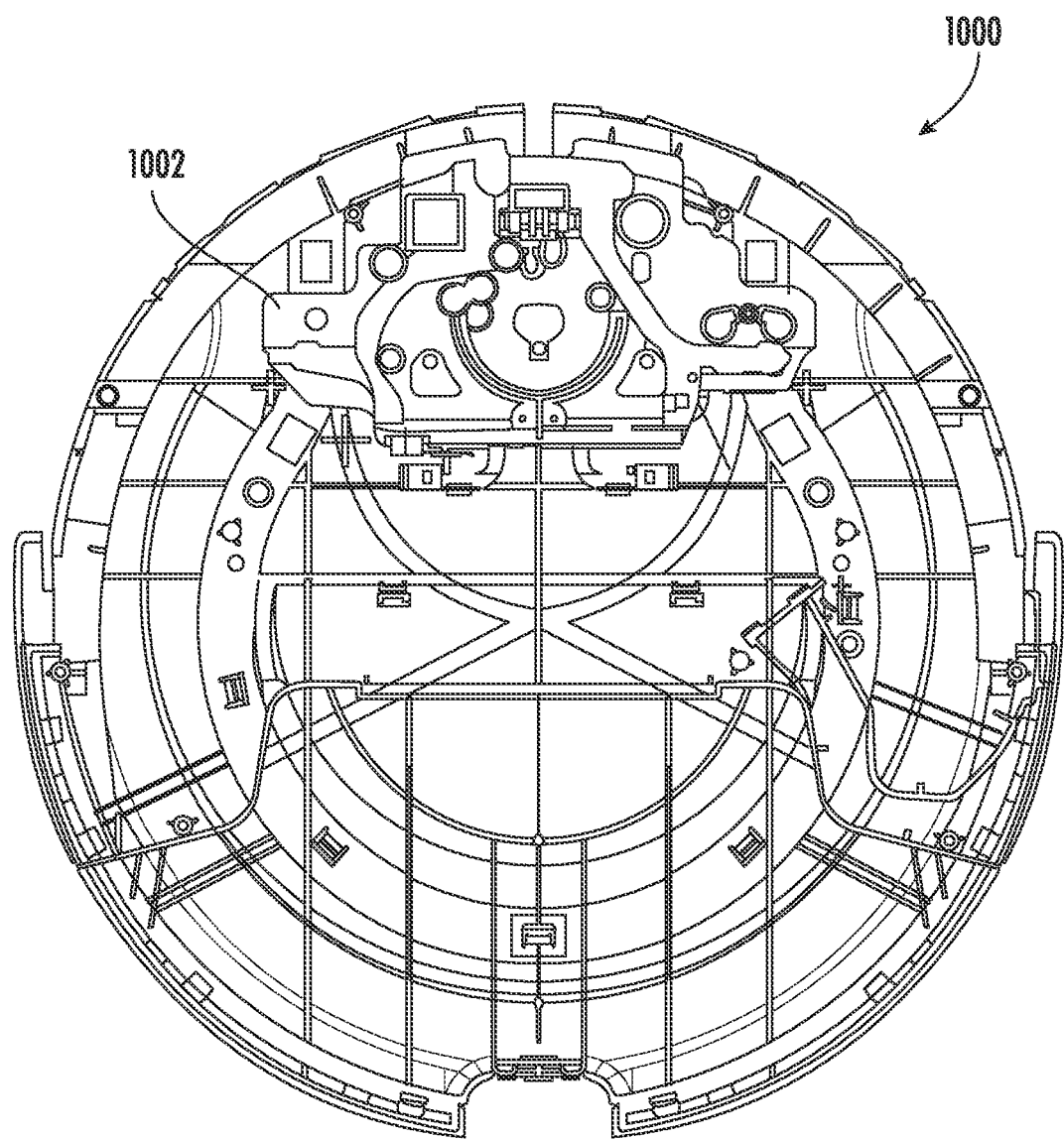
FIG. 10 is a bottom view of a top cover configured to be used with the robotic vacuum of FIG. 2, the top cover including a drip tray, consistent with embodiments of the present disclosure.

FIG. 10 shows a bottom view of a top cover 1000 of the robotic vacuum cleaner 200. As shown, the top cover 1000 includes a drip tray 1002 arranged below the user interface 204. The drip tray 1002 is configured to collect any liquid poured inadvertently on the user interface 204 and direct the liquid in a direction away from electronic components within the housing 202 of the robotic vacuum cleaner 200. The drip tray 1002 can be coupled to the top cover 1000 using one or mechanical fasteners (e.g., screws, snap fits, press fits, and/or any other mechanical fastener) and/or one or more adhesives.

Figure 11:
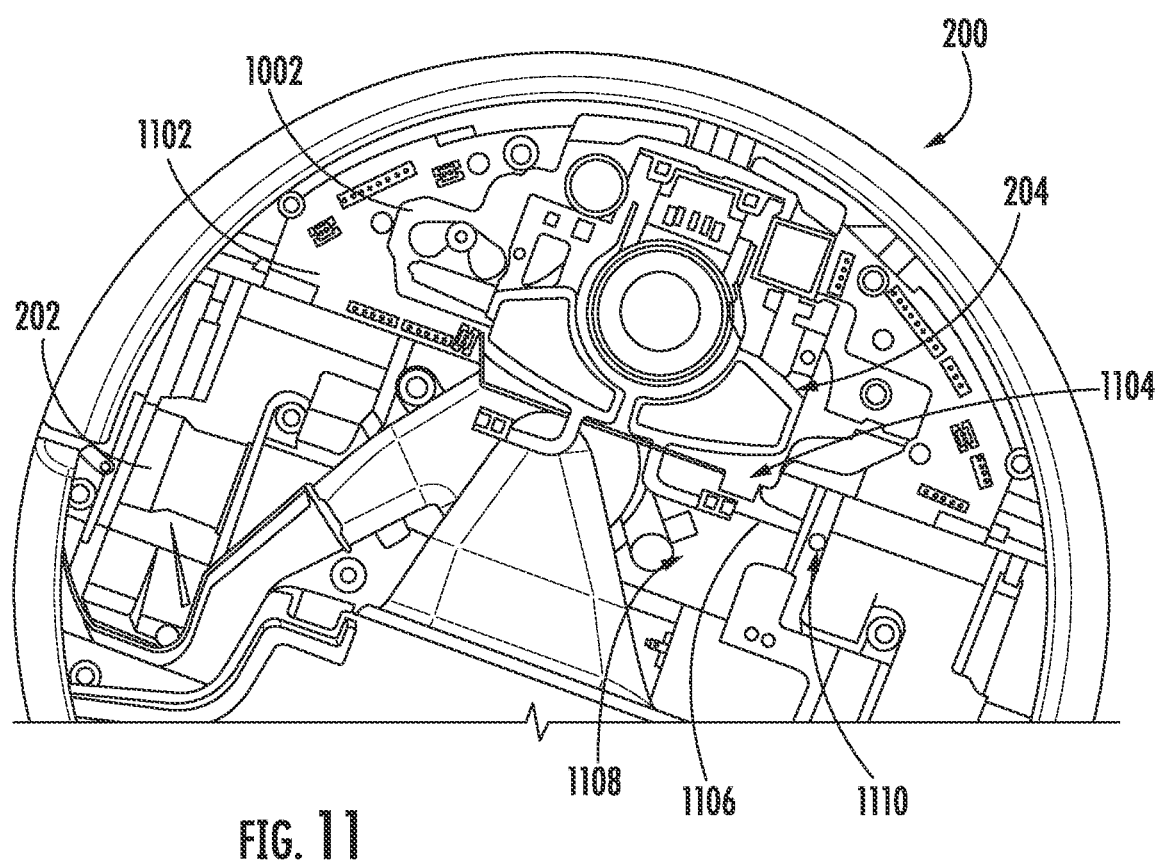
FIG. 11 is a top perspective view of the robotic vacuum cleaner of FIG. 2 having the top cover removed therefrom for purposes of clarity, consistent with embodiments of the present disclosure.

FIG. 11 shows a perspective view of the robotic vacuum cleaner 200 having the top cover 1000 removed such that the orientation of the drip tray 1002 relative to the user interface 204 and electronic systems 1102 of the robotic vacuum cleaner 200 can be shown. As shown, when a liquid is spilled on the user interface 204, the liquid is collected by the drip tray 1002. Once collected in the drip tray 1002, the liquid is directed towards a drip tray outlet 1104. The drip tray outlet 1104 is arranged such that the liquid falls into a channel 1106 extending within the housing 202 of the robotic vacuum cleaner 200. At least a portion of the channel 1106 may extend along a bottom surface 1108 of the housing 202. The channel 1106 is configured to direct the liquid to an outlet port 1110 such that the liquid is emptied into the environment of the robotic vacuum cleaner 200.

Figure 12:
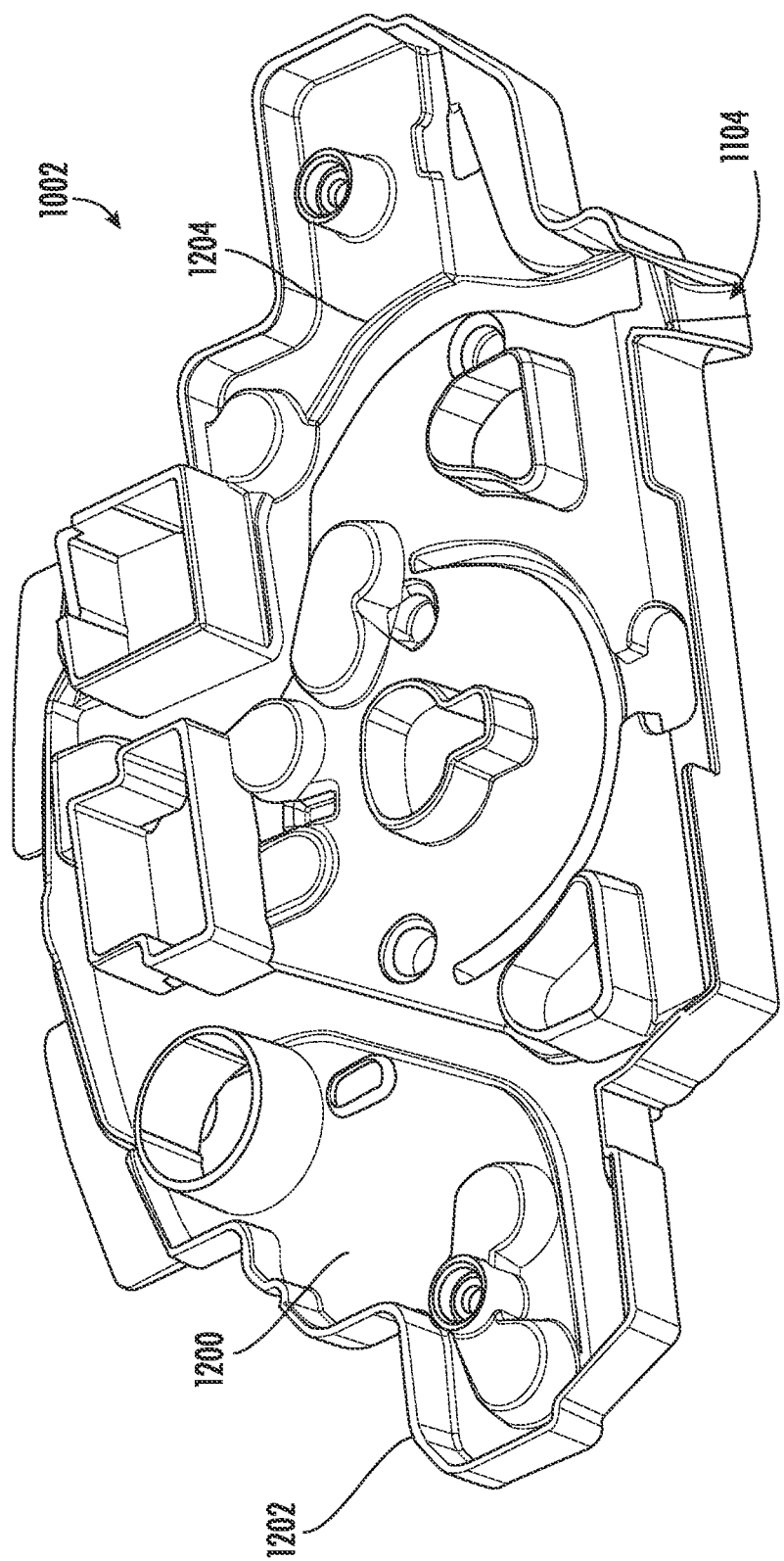
FIG. 12 is a perspective view of the drip tray of FIG. 10, consistent with embodiments of the present disclosure.

FIG. 12 shows a perspective view of the drip tray 1002. As shown, the drip tray 1002 has a base 1200 and one or more sidewalls 1202 extending from the base 1200. The one or more sidewalls 1202 may be substantially continuous (e.g., the sidewalls 1202 may include one or more discontinuities that define the drip tray outlet 1104). As such, the sidewalls 1202 are configured to retain liquid within the drip tray 1002 such that liquid may be expelled from the drip tray 1002 at one or more predetermined locations (e.g., at the drip tray outlet 1104). In some instances, the base 1200 may be contoured to direct fluid therein towards the drip tray outlet 1104. For example, the base 1200 may define one or more channels 1204 that direct liquid therein towards the drip tray outlet 1104.

Figure 13:
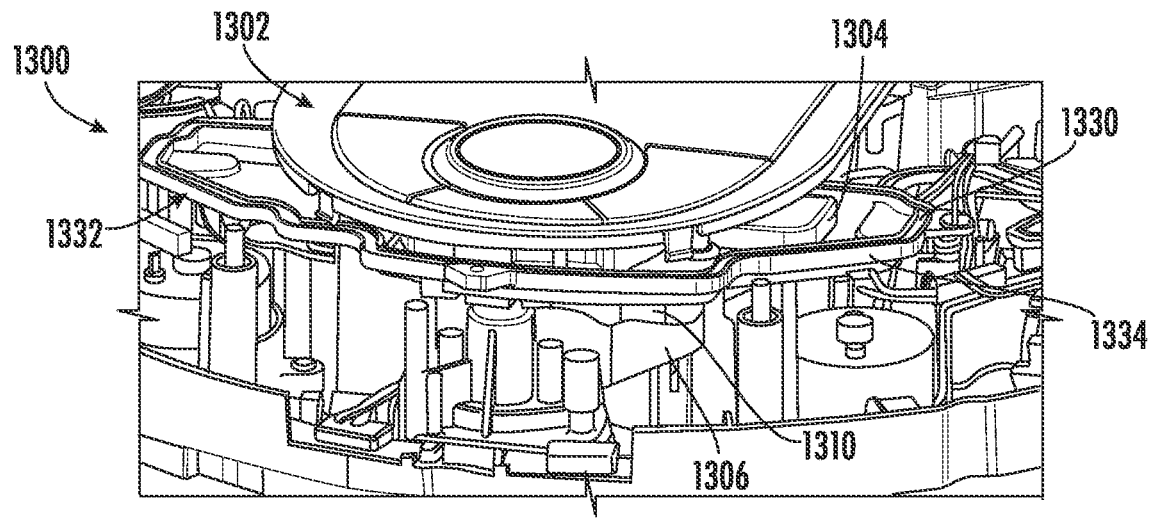
FIG. 13 shows a perspective view of a portion of a robotic vacuum cleaner having a top portion of the robotic vacuum cleaner removed therefrom for clarity, consistent with embodiments of the present disclosure.
Figure 14:
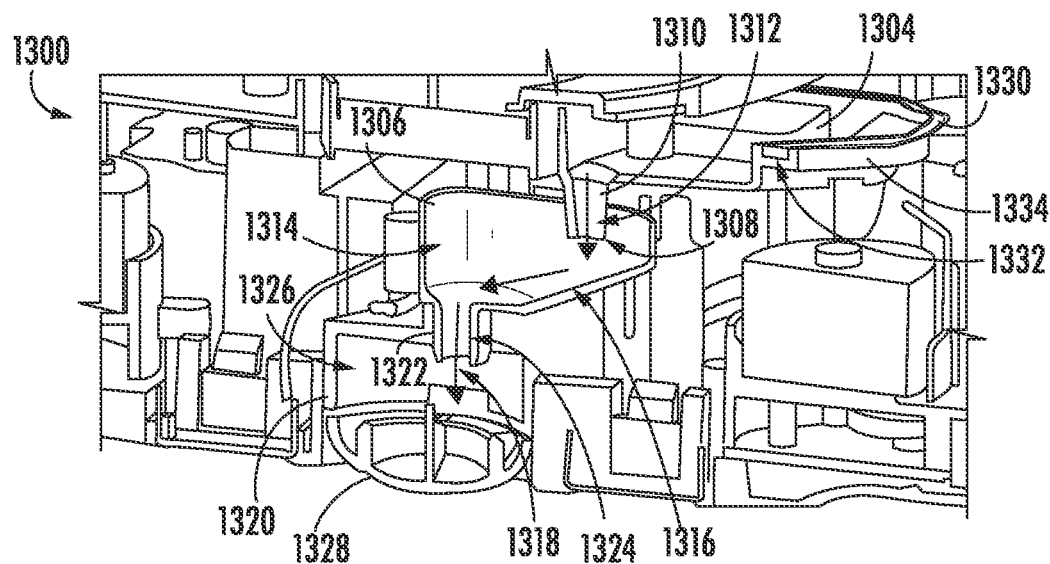
FIG. 14 shows a perspective cross-sectional view of the robotic vacuum cleaner of FIG. 13, consistent with embodiments of the present disclosure.

FIG. 13 shows a perspective view of an example of a robotic vacuum cleaner 1300, which may be an example of the robotic cleaner 100 of FIG. 1A, having a top portion of the robotic vacuum cleaner 1300 removed therefrom for clarity and FIG. 14 shows a perspective cross-sectional view of the robotic vacuum cleaner 1300. The robotic vacuum cleaner 1300 may include a user interface 1302 with which a user may control one or more functions of the robotic vacuum cleaner 1300. As shown, a first drip tray 1304 is positioned beneath at least a portion of the user interface 1302. The first drip tray 1304 is positioned such that liquid incident on the user interface 1302 is collected within the first drip tray 1304, substantially preventing liquid from reaching one or more electrical components of the robotic vacuum cleaner 1300.

The first drip tray 1304 can be fluidly coupled to a second drip tray 1306 via a first drip tray outlet 1308 such that the second drip tray 1306 receives liquid from the first drip tray 1304. At least a portion of the second drip tray 1306 can be vertically spaced apart from at least a portion of the first drip tray 1304. As shown, the first drip tray outlet 1308 can be defined within a first tray protrusion 1310 having a first protrusion channel 1312 extending therein. The first tray protrusion 1310 can extend at least partially within a second tray fluid cavity 1314 defined by the second drip tray 1306. The second tray fluid cavity 1314 can be contoured (e.g., include on or more inclined surfaces 1316) such that fluid is directed to a second drip tray fluid outlet 1318.

The second drip tray 1306 can be fluidly coupled to a fluid reservoir 1320 via the second drip tray fluid outlet 1318 such that the fluid reservoir 1320 receives liquid from the second drip tray 1306. At least a portion of the fluid reservoir 1320 may be vertically spaced apart from at least a portion of the second drip tray 1306. As such, the first drip tray 1304, the second drip tray 1306, and the fluid reservoir 1320 may generally be described as being arranged within the robotic vacuum cleaner 1300 according to a vertically stacked configuration. The second drip tray fluid outlet 1318 can be defined within a second tray protrusion 1322 having a second protrusion channel 1324 extending therein. The second tray protrusion 1322 may extend at least partially within a reservoir cavity 1326 defined by the fluid reservoir 1320. The fluid reservoir 1320 may include a removable plug 1328, wherein the removable plug 1328 defines a portion of the reservoir cavity 1326. As such, fluid collected in the reservoir cavity 1326 can be emptied therefrom by removal of the removable plug 1328. Alternatively, the fluid reservoir 1320 may not include a removable plug 1328 and the reservoir cavity 1326 may have an open end such that fluid passes therethrough and into a surrounding environment.

In some instances, the first drip tray 1304 can include a seal 1330 extending within a groove 1332. The groove 1332 is defined in a distal end of one or more sidewalls 1334 that define at least a portion of the first drip tray 1304. The seal 1330 can be configured to engage a corresponding portion of an upper surface of the robotic vacuum cleaner 1300 when the first drip tray 1304 is coupled thereto. As such, the seal 1330 may prevent or mitigate a quantity of liquid that inadvertently splashes out of the first drip tray 1304.

Figure 15:
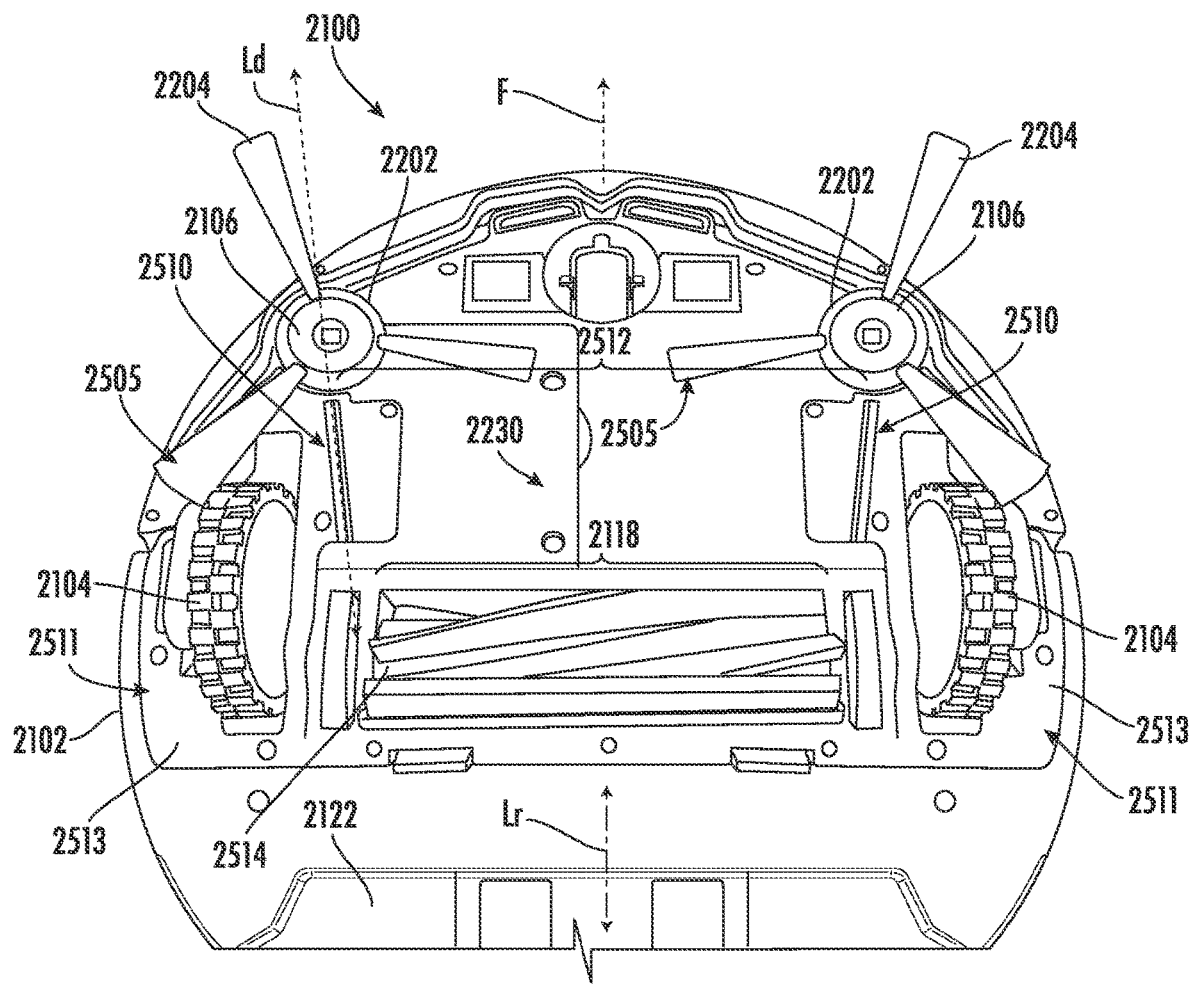
FIG. 15 is a perspective bottom view of a robotic cleaner, consistent with embodiments of the present disclosure.

FIG. 15 shows an example of one embodiment of a robotic cleaner 2100 including one or more side brush debris deflectors 2510, which may be an example of the robotic cleaner 100 of FIG. 1A. The robotic cleaner 2100 may include a body (or housing) 2102, a plurality of drive wheels 2104, and at least one side brush 2106. The drive wheels 2104 are coupled to at least one drive motor such that actuation of the drive motor causes the drive wheels 2104 to urge the robotic cleaner 2100 across a surface (e.g., a floor). The side brush 2106 is rotatably coupled to the body 2102 such that a brush motor and/or drive motor coupled to the side brush 2106 causes a rotation of the side brush 2106.

The side brushes 2106 may include any side brush design known to those skilled in the art. In at least one embodiment, one or more of the side brushes 2106 may include one or more tufts 2505 of bristles 2204 extending from the hub 2202 as generally illustrated in FIG. 15. In the illustrated embodiment, the side brush 2106 includes a plurality of tufts 2505 of bristles 2204 having the same length; however, it should be appreciated that one or more of the bristles 2204 in a tuft 2505 may have a different length and/or that one or more of the plurality of tufts 2505 may have bristles 2204 having a different length than the bristles 2204 of another one of the plurality of tufts 2505. In some instances, one or more of the side brushes 2106 may include a plurality of bristles 2204 which extend continuously around the hub 2202. At least one of the plurality of bristles 2204 may form a first angle with the peripheral surface of the hub 2202 and at least one of the plurality of bristles 2204 may form a second angle with the peripheral surface of the hub 2202 which is greater than the first angle and/or at least one of the plurality of bristles 2204 may have a first bristle length and at least one of the plurality of bristles 2204 has a second bristle length, the first bristle length is less than the second bristle length.

In any case, rotation of the side brush 2106 is intended to urge debris on a surface in a direction of an air inlet (or vacuum inlet) 2118. In one example, at least a portion of the side brush 2106 extends beyond a periphery of the body 2102 such that debris adjacent the body 2102 can be urged towards the vacuum inlet 2118. As may be appreciated, however, the side brushes 2106 may contact debris and inadvertently cause the debris to be spun around the side brush 2106 (e.g., between the side brush 2106 and the drive wheels 2104 and/or between the drive wheels 2104 and the vacuum inlet 2118) and ejected beyond the robotic cleaner 2100. As a result, the debris may not be urged towards the vacuum inlet 2118, and thus may not be picked up by the robotic cleaner 2100.

To address this problem, the robotic cleaner 2100 may include one or more side brush deflectors 2510 configured to reduce and/or eliminate debris from being inadvertently spun around the side brush 2106 and ejected beyond the robotic cleaner 2100. The side brush deflector 2510 may therefore be configured to trap and/or collect debris in an area under the robotic cleaner 2100 and in front on the vacuum inlet 2118. As a result, debris propelled by the side brushes 2106 will be directed towards the vacuum inlet 2118 and ultimately be drawn through the vacuum inlet 2118 and deposited within a dust cup 2122.

The side brush deflector 2510 may include a strip of flexible material and/or a plurality of bristles (also referred to as deflector bristles) extending downwardly from the floor facing surface 2230 of the robotic cleaner 2100 generally towards the floor. The side brush deflector 2510 may be sufficiently flexible to allow the side brush deflector 2510 to generally conform to varying surface contours. The side brush deflector 2510 may extend downwardly from the floor facing surface 2230 partially and/or all the way towards the floor. Some or all of the bristles 2204 of the side brush 2106 may pass through at least a portion of the side brush deflector 2510. Alternatively (or in addition), some or all of the bristles 2204 of the side brush 2106 may pass below at least a portion of the side brush deflector 2510. The side brush deflector 2510 can be coupled to a housing 2513 of a drive wheel module 2511 that includes the drive wheel 2104, and a motor configured to rotate the drive wheel 2104. As shown, the drive wheel module 2511 is removably coupled to the robotic cleaner 2100. As such, when the drive wheel module 2511 is removed from the robotic cleaner 2100, the side brush deflector 2510 is removed with the drive wheel module 2511. Additionally, or alternatively, the side brush deflector 2510 can be removably coupled to the housing 2513 of the drive wheel module 2511.

In the illustrated embodiment, the side brush deflector 2510 is shown as a substantially continuous strip of flexible material and/or a plurality of bristles; however, it should be appreciated that the side brush deflector 2510 may not be continuous. For example, the side brush deflector 2510 may be formed by a plurality of discrete and/or discontinuous sections. The side brush deflector 2510 may have a linear or non-linear configuration. The side brush deflector 2510 may extend within all or a portion of a region between the side brushes 2106 and the vacuum inlet 2118 and/or an agitator 2514; however, a portion of the side brush deflector 2510 may also extend in a region forward of the side brushes 2106 (i.e., closer to the front of the robotic cleaner 2100 than the side brushes 2106) and/or behind the vacuum inlet 2118 and/or an agitator 2514 (i.e., closer to the rear of the robotic cleaner 2100 than the vacuum inlet 2118 and/or an agitator 2514).

One or more of the side brush deflectors 2510 may be arranged with a longitudinal axis Ld that is either parallel to or non-parallel to the longitudinal axis Lr and/or the forward direction F of the robotic cleaner 2100. In the illustrated embodiment, the robotic cleaner 2100 is shown having two side brush deflectors 2510 arranged with the longitudinal axes Ld that are non-parallel to the longitudinal axis Lr and/or the forward direction F of the robotic cleaner 2100. For example, the side brush deflector 2510 may be arranged to form a debris chute or channel 2512. The debris chute or channel 2512 is defined as an area extending laterally between the side brush deflectors 2510 and extending vertically between the floor facing surface 2230 of the robotic cleaner 2100 and floor. The debris chute or channel 2512 may be configured to generally direct debris towards the vacuum inlet 2118 and/or an agitator 2514 (which may be disposed at least partially within vacuum inlet 2118 and/or separately from the vacuum inlet 2118). According to one embodiment, the debris chute or channel 2512 may have a generally tapered configuration in which the lateral dimension of the debris chute or channel 2512 (i.e., the left to right dimension) becomes smaller when moving closer to the vacuum inlet 2118 and/or an agitator 2514. The tapered configuration of the debris chute or channel 2512 may aid in directing debris towards the vacuum inlet 2118 and/or an agitator 2514 while also allowing the side brushes 2106 to be disposed further apart laterally from each other, thus increasing the sweep area of the side brushes 2106. The taper of the debris chute or channel 2512 may be either linear or nonlinear. While the illustrated embodiment of the robotic cleaner 2100 is shown having two side brush deflectors 2510, it should be appreciated that the robotic cleaner 2100 may have only one side brush deflector 2510 or more than two side brush deflectors 2510.

A robotic vacuum cleaner, consistent with the present disclosure, may include a housing, a displaceable bumper, an emitter/detector pair, and at least one divider. The displaceable bumper may be moveably coupled to the housing and may be configured to be displaced along at least one axis. The emitter/detector pair may have an emitter and a detector, wherein the emitter is configured to emit light through at least a portion of the displaceable bumper. The at least one divider may be disposed between the emitter and the detector of the emitter/detector pair.

In some instances, the displaceable bumper may be configured to be displaced along at least two axes. In some instances, the at least one divider may be coupled to the displaceable bumper. In some instances, the at least one divider may be coupled to the housing. In some instances, the divider may include a compressible foam. In some instances, the displaceable bumper may include a wiper extending from the displaceable bumper in a direction of the housing. In some instances, the displaceable bumper may be configured to actuate one or more optical break switches in response to being displaced. In some instances, the one or more optical break switches may be configured to support the displaceable bumper at a position spaced apart from a top surface of the housing. In some instances, the robotic vacuum cleaner may further include one or more docking sensors. In some instances, the one or more docking sensors may be disposed within a shadowbox. In some instances, the at least one divider may extend along at least a portion of one or more sides of the shadowbox.

A robotic vacuum cleaner, consistent with the present disclosure, may include a housing, a user interface, a displaceable bumper, an emitter/detector pair, and at least one divider. The displaceable bumper may be moveably coupled to the housing and the may be configured to be displaced along at least one axis. The emitter/detector pair may have an emitter and a detector, wherein the emitter is configured to emit light through at least a portion of the displaceable bumper. The at least one divider may be disposed between the emitter and the detector of the emitter/detector pair.

In some instances, the robotic vacuum cleaner may further include a first drip tray configured to collect liquid incident on the user interface. In some instances, the robotic vacuum cleaner may further include a second drip tray, wherein the first drip tray is fluidly coupled to the second drip tray, the second drip tray configured to receive liquid from the first drip tray. In some instances, the robotic vacuum cleaner may further include a fluid reservoir fluidly coupled to the second drip tray, the fluid reservoir configured to receive liquid from the second drip tray. In some instances, the fluid reservoir may include a removable plug. In some instances, the robotic vacuum cleaner may include one or more docking sensors. In some instances, the one or more docking sensors may be disposed within a shadowbox. In some instances, the at least one divider may extend along at least a portion of one or more sides of the shadowbox. In some instances, the at least one divider may be coupled to the displaceable bumper.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:
1. A robotic vacuum cleaner comprising:
a housing;

a displaceable bumper moveably coupled to the housing, the displaceable bumper being configured to be displaced along at least one axis;
an emitter/detector pair having an emitter and a detector, the emitter configured to emit light through at least a portion of the displaceable bumper; and
at least one divider disposed between the emitter and the detector of the emitter/detector pair, the at least one divider being resiliently compressible.

2. The robotic vacuum cleaner of claim 1, wherein the displaceable bumper is configured to be displaced along at least two axes.

3. The robotic vacuum cleaner of claim 1, wherein the at least one divider is coupled to the displaceable bumper.

4. The robotic vacuum cleaner of claim 1, wherein the at least one divider is coupled to the housing.

5. The robotic vacuum cleaner of claim 1, wherein the divider includes a compressible foam.

6. The robotic vacuum cleaner of claim 1, wherein the displaceable bumper includes a wiper extending from the displaceable bumper in a direction of the housing.

7. The robotic vacuum cleaner of claim 1, wherein the displaceable bumper is configured to actuate one or more optical break switches in response to being displaced.

8. The robotic vacuum cleaner of claim 7, wherein the one or more optical break switches are configured to support the displaceable bumper at a position spaced apart from a top surface of the housing.

9. The robotic vacuum cleaner of claim 1 further comprising one or more docking sensors.

10. The robotic vacuum cleaner of claim 9, wherein the one or more docking sensors are disposed within a shadowbox.

11. The robotic vacuum cleaner of claim 10, wherein the at least one divider extends along at least a portion of one or more sides of the shadowbox.

12. A robotic vacuum cleaner comprising:
a housing;
a user interface;
a displaceable bumper moveably coupled to the housing, the displaceable bumper being configured to be displaced along at least one axis;
an emitter/detector pair having an emitter and a detector, the emitter configured to emit light through at least a portion of the displaceable bumper; and
at least one divider disposed between the emitter and the detector of the emitter/detector pair, the at least one divider being resiliently compressible.

13. The robotic vacuum cleaner of claim 12 further comprising a first drip tray configured to collect liquid incident on the user interface.

14. The robotic vacuum cleaner of claim 13 further comprising a second drip tray, wherein the first drip tray is fluidly coupled to the second drip tray, the second drip tray configured to receive liquid from the first drip tray.

15. The robotic vacuum cleaner of claim 14 further comprising a fluid reservoir fluidly coupled to the second drip tray, the fluid reservoir configured to receive liquid from the second drip tray.

16. The robotic vacuum cleaner of claim 15, wherein the fluid reservoir includes a removable plug.

17. The robotic vacuum cleaner of claim 12 further comprising one or more docking sensors.

18. The robotic vacuum cleaner of claim 17, wherein the one or more docking sensors are disposed within a shadowbox.

19. The robotic vacuum cleaner of claim 18, wherein the at least one divider extends along at least a portion of one or more sides of the shadowbox.

20. The robotic vacuum cleaner of claim 12, wherein the at least one divider is coupled to the displaceable bumper.

* * * * *